United States Patent
Talley et al.

(10) Patent No.: US 11,151,270 B2
(45) Date of Patent: *Oct. 19, 2021

(54) SYSTEMS AND METHODS FOR MULTI-TENANT DATA PROTECTION APPLICATION

(71) Applicant: Nakivo, Inc., Campbell, CA (US)

(72) Inventors: Bruce Talley, Campbell, CA (US); Simonov Veniamin Serhiovych, Kyiv (UA); Abdalla Nail Ahmad Amin, Kharkov (UA); Osypov Oleksii Serhiovych, Kyiv (UA); Serdyuk Serhiy Mykolayovych, Kyiv (UA)

(73) Assignee: Nakivo, Inc., Campbell, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/953,620

(22) Filed: Apr. 16, 2018

(65) Prior Publication Data

US 2019/0018973 A1    Jan. 17, 2019

Related U.S. Application Data

(63) Continuation of application No. 14/551,383, filed on Nov. 24, 2014, now Pat. No. 9,946,889.

(Continued)

(51) Int. Cl.
*G06F 21/62*   (2013.01)
*G06F 11/20*   (2006.01)
(Continued)

(52) U.S. Cl.
CPC ...... *G06F 21/6218* (2013.01); *G06F 11/2094* (2013.01); *G06F 16/256* (2019.01); *G06F 11/1448* (2013.01); *G06F 11/2071* (2013.01); *G06F 11/3006* (2013.01); *G06F 11/3055* (2013.01)

(58) Field of Classification Search
None
See application file for complete search history.

(56) References Cited

U.S. PATENT DOCUMENTS 8,341,128 B1 * 12/2012 Ruggiero ............ G06F 16/2315
707/690
10,264,058 B1 * 4/2019 Lauinger ............. G06F 9/45558
(Continued)

*Primary Examiner* — Thu N Nguyen
(74) *Attorney, Agent, or Firm* — Tillman Wright, PLLC; Jeremy C. Doerre; Chad D. Tillman

(57) ABSTRACT

A system for providing a multi-tenant data protection application includes a server shared by all tenants for access to the provided multi-tenant data protection application. The system further includes business logic for managing tenants of the multi-tenant data protection application, tenant resource allocation and isolation of tenant operating environments. The system additionally includes a database server for creating, managing and maintaining databases, including a master database used to store configuration and monitoring data which is used for tenant management and monitoring, and a plurality of private tenant databases, each used to store tenant-specific configuration, tenant-specific data and associated tenant resources. The system includes one or more data protection engines configured to store a copy of protected data at tenant redundant data stores.

16 Claims, 28 Drawing Sheets

Related U.S. Application Data

(60) Provisional application No. 61/909,377, filed on Nov. 27, 2013.

(51) Int. Cl.
*G06F 16/25* (2019.01)
*G06F 11/14* (2006.01)
*G06F 11/30* (2006.01)

(56) References Cited

U.S. PATENT DOCUMENTS

2013/0103641 A1* 4/2013 Rehman .................. G06F 3/048
                                                                        707/609
2016/0212020 A1* 7/2016 Gupte ................. H04L 41/5054

* cited by examiner

SYSTEMS AND METHODS FOR MULTI-TENANT DATA PROTECTION APPLICATION

CROSS-REFERENCE TO RELATED APPLICATION

The present application is a U.S. continuation patent application of, and claims priority under 35 U.S.C. § 120 to, U.S. nonprovisional patent application Ser. No. 14/551,383, filed Nov. 24, 2014, which nonprovisional patent application published as U.S. patent application publication no. 2015/0205974 and will issue as U.S. Pat. No. 9,946,889 on Apr. 17, 2018, which patent application, any patent application publications thereof, and any patents issuing therefrom, including the '889 patent, are hereby incorporated herein by reference, and which '383 application is a U.S. nonprovisional patent application of, and claims priority under 35 U.S.C. § 119(e) to, U.S. provisional patent application Ser. No. 61/909,377, filed Nov. 27, 2013, which provisional patent application is incorporated by reference herein. A copy of this provisional is attached hereto as Appendix A, which is hereby incorporated herein by reference.

COPYRIGHT STATEMENT

All of the material in this patent document is subject to copyright protection under the copyright laws of the United States and other countries. The copyright owner has no objection to the facsimile reproduction by anyone of the patent document or the patent disclosure, as it appears in official governmental records but, otherwise, all other copyright rights whatsoever are reserved.

BACKGROUND OF THE INVENTION

The present invention generally relates to computer implemented methods, systems, and computer programs to provide multi-tenant data protection.

Many enterprises perform redundant copying of data—such as data backup, replication or mirroring—to protect their business data. In case the original data is lost, the data can be restored from a relevant redundant copy.

For the purpose of automation, simplification and reduction of manual processes, most businesses use specialized software and hardware technologies to implement processes related to redundant copying of data.

There are many data protection applications intended to satisfy the aforesaid business demand, but most of them are not scalable enough to serve large enterprises with multiple separate business units or cloud service providers with many customers. A common drawback for those applications is that all the data inside such an application is managed in a single pile, without any logical isolation and permission management.

As enterprise computing and cloud technologies keep evolving, there is an emerging need for a scalable multi-user and multi-tenant system for creating redundant copies of data, that can serve multiple tenants at the same time, separating their data and activities, but still providing a central point of access and management.

This need and other needs are addressed by one or more aspects of the present invention.

SUMMARY OF THE INVENTION

The present invention includes many aspects and features. Moreover, while many aspects and features relate to, and are described in a particular context, the present invention is not limited to use only in this context, as will become apparent from the following summaries and detailed descriptions of aspects, features, and one or more embodiments of the present invention.

Accordingly, one aspect of the present invention relates to a scalable system for providing data protection applications to multiple logically, physically or otherwise distributed tenants, and for separating data and resources in such a system on a per tenant basis.

Another aspect relates to a system that provides data protection capabilities to multiple isolated tenants, thus reducing the total cost of corresponding hardware and software. In accordance with one or more features, the complexity and fragility of the system is decreased to enable centralized management and monitoring of tenants, and to provide a self-service interface to tenants.

Another aspect relates to a method for providing multi-tenant data protection. The method includes maintaining, at a database server, a master database containing configuration data for the plurality of tenants, and a plurality of tenant databases, each tenant database being associated with one of the plurality of tenants and containing tenant-specific information related to data to be protected for that tenant; maintaining, by one or more data protection engines, a plurality of redundant tenant data stores, each redundant tenant data store containing a copy of data to be protected for that tenant, whereby the plurality of redundant tenant data stores provide tenant-specific data redundancy; displaying, to a first user via a software application loaded on a first computer, an authentication user interface; receiving, from the first user via one or more input devices associated with the first computer, input corresponding to authentication credentials; determining, based on a comparison of the authentication credentials to authentication information maintained in the master database, that the authentication credentials are valid authentication credentials associated with a first tenant of the plurality of tenants; displaying, to the first user via the software application loaded on the first computer, a user interface facilitating data protection functionality; receiving, from the first user via one or more input devices associated with the first computer, input into the user interface facilitating data protection functionality corresponding to an identification of data stored at a remote server to be protected, and authorization credentials associated with the data to be protected; receiving, at a business logic module running on an application server, based on the user input, an indication of the data to be protected, and the authorization credentials; communicating, from the business logic module to a database server module, an indication of the data to be protected, and the authorization credentials; storing, by the database server module at a tenant database associated with the first tenant, an indication of the data to be protected, and the authorization credentials; communicating, from the business logic module to a data protection engine running on a data protection computer, an indication of the data to be protected, and the authorization credentials; accessing, by the data protection engine using the authorization credentials, the data to be protected from the remote server; and storing, by the data protection engine, a copy of the data to be protected at a tenant redundant data store associated with the first tenant.

In a feature of this aspect, the one or more data protection engines include a respective data protection engine for each one of the tenant data protection stores. In one or more implementations, each of the data protection engines is loaded on a separate data protection computer.

In a feature of this aspect, the software application comprises a web browser.

In a feature of this aspect, the software application comprises a command line utility.

In a feature of this aspect, the software application comprises a desktop client application.

In a feature of this aspect, the application server comprises a plurality of physical machines.

In a feature of this aspect, the database server comprises a plurality of physical machines.

In a feature of this aspect, the application server comprises a plurality of physical machines.

In a feature of this aspect, the database server comprises a plurality of physical machines.

In a feature of this aspect, the application server is a virtual machine.

In a feature of this aspect, the database server is a virtual machine.

In a feature of this aspect, the data protection computer is a virtual machine.

In a feature of this aspect, the application server comprises a virtual machine.

In a feature of this aspect, the database server comprises a virtual machine.

In a feature of this aspect, the data protection computer comprises a virtual machine.

In a feature of this aspect, the software application comprises an arbitrary third-party program.

Another aspect relates to a method for providing multi-tenant data protection. The method includes maintaining, at a database server, a master database containing configuration data for the plurality of tenants, and a plurality of tenant databases, each tenant database being associated with one of the plurality of tenants and containing tenant-specific information related to data to be protected for that tenant; maintaining, by one or more data protection engines, a plurality of redundant tenant data stores, each redundant tenant data store containing a copy of data to be protected for that tenant, whereby the plurality of redundant tenant data stores provide tenant-specific data redundancy; displaying, to a first user via a software application loaded on a first computer, an authentication user interface; receiving, from the first user via one or more input devices associated with the first computer, input corresponding to authentication credentials; determining, based on a comparison of the authentication credentials to authentication information maintained in the master database, that the authentication credentials are valid authentication credentials associated with a first tenant of the plurality of tenants; displaying, to the first user via the software application loaded on the first computer, a user interface facilitating data protection functionality; receiving, from the first user via one or more input devices associated with the first computer, input into a user interface corresponding to an identification of data stored at a remote server to be protected; receiving, at a business logic module running on an application server, based on the user input, an indication of the data to be protected; communicating, from the business logic module to a database server module, an indication of the data to be protected; storing, by the database server module at a tenant database associated with the first tenant, an indication of the data to be protected, and the authorization credentials; communicating, from the business logic module to a data protection engine running on a data protection computer, an indication of the data to be protected; accessing, by the data protection engine, the data to be protected from the remote server; and storing, by the data protection engine, a copy of the data to be protected at a tenant redundant data store associated with the first tenant.

Another aspect relates to a method for providing multi-tenant data protection. The method includes maintaining, at a database server, a master database containing configuration data for the plurality of tenants, and a plurality of tenant databases, each tenant database being associated with one of the plurality of tenants and containing tenant-specific information related to data to be protected for that tenant; maintaining, by one or more data protection engines, a plurality of redundant tenant data stores, each redundant tenant data store containing a copy of data to be protected for that tenant, whereby the plurality of redundant tenant data stores provide tenant-specific data redundancy; displaying, to a first user via a software application loaded on a first computer, an authentication user interface; receiving, from the first user via one or more input devices associated with the first computer, input corresponding to authentication credentials; determining, based on a comparison of the authentication credentials to authentication information maintained in the master database, that the authentication credentials are valid authentication credentials associated with a first tenant of the plurality of tenants; displaying, to the first user via the software application loaded on the first computer, a user interface facilitating data protection functionality; receiving, from the first user via one or more input devices associated with the first computer, input into a user interface corresponding to an identification of data stored at a remote server to be protected, and authorization credentials associated with the data to be protected; receiving, at a business logic module running on an application server, based on the user input, an indication of the data to be protected, and the authorization credentials; communicating, from the business logic module to a database server module, an indication of the data to be protected, and the authorization credentials; storing, by the database server module at a tenant database associated with the first tenant, an indication of the data to be protected, and the authorization credentials; communicating, from the business logic module to a source data protection engine running on a data protection computer, an indication of the data to be protected, and the authorization credentials; accessing, by the source data protection engine, the data to be protected from the remote server; and communicating, from the source data protection engine to a target data protection engine, the data to be protected; and storing, by the target data protection engine, a copy of the data to be protected at a tenant redundant data store associated with the first tenant.

In a feature of this aspect, the source data protection engine and the target data protection engine are running on the same computer.

In a feature of this aspect, the source data protection engine and the target data protection engine are running on different computers.

Another aspect relates to a method for adding a new tenant to a multi-tenant data protection application. The method includes maintaining, at a database server, a master database containing configuration data for the plurality of tenants, and a plurality of tenant databases, each tenant database being associated with one of the plurality of tenants and containing tenant-specific information related to data to be protected for that tenant; maintaining, by one or more data protection engines, a plurality of redundant tenant data stores, each redundant tenant data store containing a copy of data to be protected for that tenant, whereby the plurality of redundant tenant data stores provide tenant-specific data redundancy; allocating a portion of shared resources to a new tenant; storing user data for the new tenant in the master database; and creating a new tenant database for the new tenant.

In a feature of this aspect, the one or more data protection engines include a respective data protection engine for each one of the tenant data protection stores.

In one or more implementations, each of the data protection engines is loaded on a separate data protection computer.

In a feature of this aspect, the database server comprises a plurality of physical machines.

In a feature of this aspect, the database server is a virtual machine.

In a feature of this aspect, the one or more data protection engines are running on a data protection computer.

In a feature of this aspect, each of the data protection engines is running on a respective data protection computer.

In a feature of this aspect, one or more of the data protection engines is running on a virtual machine.

Another aspect relates to a method for changing the operational state of a tenant in a multi-tenant data protection application. The method includes maintaining, at a database server, a master database containing configuration data for the plurality of tenants, and a plurality of tenant databases, each tenant database being associated with one of the plurality of tenants and containing tenant-specific information related to data to be protected for that tenant; maintaining, by one or more data protection engines, a plurality of redundant tenant data stores, each redundant tenant data store containing a copy of data to be protected for that tenant, whereby the plurality of redundant tenant data stores provide tenant-specific data redundancy; determining that a first tenant is currently in a running operational state; closing the tenant database for the first tenant; and storing information associated with a new operational state for the first tenant.

Another aspect relates to a system for providing a multi-tenant data protection application, the system comprising a user interface shared by all tenants to access the provided multi-tenant data protection application; business logic for managing tenants of the multi-tenant data protection application, tenant resource allocation and isolation of tenant operating environments; a database server for creating, managing and maintaining databases; one or more computers executing the aforesaid components of the multi-tenant data protection application.

In a feature of this aspect, the system further includes a master database used to store configuration and monitoring data which is used for tenant management and monitoring. In one or more implementations, the system further includes a plurality of private tenant databases, each used to store tenant-specific configuration, tenant-specific data and associated tenant resources. In one or more implementations, the system further includes a structured query language (SQL) server application configured to create and maintain a master database or tenant databases.

In a feature of this aspect, the multi-tenant data protection application is running on a single computer executing all components of the multi-tenant data protection application.

In a feature of this aspect, the multi-tenant data protection application is running on multiple computers, each executing one or more components of the multi-tenant data protection application.

In a feature of this aspect, the multi-tenant data protection application is configured to: receive requests from the users; provide responses to the user requests; execute the business logic; execute database requests; maintain databases and user data; and maintain tenant-associated resources.

In a feature of this aspect, the multi-tenant data protection application is further configured to: create new tenants, tenant databases and data on a per tenant basis; and remove tenants, tenant databases and data on a per tenant basis.

In a feature of this aspect, the multi-tenant data protection application is further configured to: monitor status of a tenant; and monitor a tenant operational state.

In a feature of this aspect, the multi-tenant data protection application is further configured to: temporarily disable tenant operation on a per tenant basis; and enable tenant operation on a per tenant basis in case the tenant operation is disabled.

In a feature of this aspect, the multi-tenant data protection application is further configured to: provide visual and messaging notifications that represent general tenant status; and provide visual and messaging notifications that represent tenant operational state.

In a feature of this aspect, the system further includes a data protection engine utilized to create and maintain redundant copies of data; and a computer executing the data protection engine. In one or more implementations, the data protection engine is configured to: receive requests from the multi-tenant data protection application; receive requests from other data protection engines; provide responses to the received requests; and transmit data and requests. In one or more implementations, the data protection engine is configured to create redundant copies of data; update redundant copies of data; process redundant copies of data; transfer redundant copies of data; and remove redundant copies of data. In one or more implementations, the data protection engine is configured to extract data from redundant copies. In one or more implementations, the data protection engine is configured to manage and maintain redundant data storage. In one or more implementations, multiple data protection engines are used on a per tenant basis. In one or more implementations, a shared data protection engine is used by multiple tenants.

In a feature of this aspect, the system further includes redundant data storage configured to store redundant copies of data. In one or more implementations, private redundant data storage is utilized on a per tenant basis. In one or more implementations, common redundant data storage is shared by multiple tenants.

Another aspect relates to a method for providing a multi-tenant data protection application. The method includes receiving a request for the multi-tenant data protection application from one of the plurality of tenants; in response to the request, locating resources associated with the tenant; responding to the request for the multi-tenant data protection application utilizing tenant-associated resources.

In a feature of this aspect, locating the resources associated with the tenant comprises querying a master database.

In a feature of this aspect, locating the resources associated with the tenant comprises querying a tenant database.

In a feature of this aspect, tenant-associated resources comprise data protection engines. In one or more implementations, a data protection engine is configured to receive requests from the data protection application; receive requests from other data protection engines; provide responses to the received requests; and transmit data and requests. In one or more implementations, a data protection engine is configured to: create redundant copies of data; update redundant copies of data; transfer redundant copies of data; process redundant copies of data; and remove redundant copies of data. In one or more implementations, a data protection engine is configured to extract data from redundant copies. In one or more implementations, a data protection engine is configured to manage and maintain redundant data storage.

In a feature of this aspect, tenant-associated resources comprise redundant data storage. In one or more implementations, the redundant data storage is configured to store redundant copies of data. In one or more implementations, the private redundant data storage is utilized on a per tenant basis. In one or more implementations, the redundant data storage is shared across multiple tenants.

In a feature of this aspect, tenant-associated resources comprise redundant copies of data. In one or more implementations, the redundant copies of data comprise data backups. In one or more implementations, the redundant copies of data comprise data replicas. In one or more implementations, the redundant copies of data comprise mirror copies of data. In one or more implementations, the redundant copies of data comprise image level copies of data. In one or more implementations, the redundant copies of data comprise file level copies of data. In one or more implementations, the redundant copies of data comprise block level copies of data.

In a feature of this aspect, the tenant-associated resources comprise computing resources.

In a feature of this aspect, the method further includes monitoring a current status of the tenant; reporting current status of the tenant in the form of visual notifications; and reporting current status of the tenant in the form of messaging notifications.

Another aspect relates to a method for providing access to a multi-tenant data protection application. The method includes providing a single user interface to a plurality of tenants; requiring authentication prior to providing access to the multi-tenant data protection application; and requiring authorization prior to providing access to certain functional areas of the multi-tenant data protection application.

In a feature of this aspect, the user interface comprises web interface.

In a feature of this aspect, the user interface comprises command line interface.

In a feature of this aspect, the user interface comprises desktop interface.

In a feature of this aspect, the user interface comprises application programming interface.

In a feature of this aspect, the authentication comprises username and password verification.

In a feature of this aspect, the authentication comprises secure certificate verification.

In a feature of this aspect, the authentication comprises hardware verification.

In a feature of this aspect, the authorization comprises verifying permission to perform an action.

In a feature of this aspect, the authorization comprises verifying attachment of the user to a role.

In a feature of this aspect, the authorization comprises attachment of the user to a user group.

Another aspect relates to a method for monitoring and reporting the tenant status in a multi-tenant data protection application. The method includes checking for new events within the tenant operating environment; aggregating the summary of the events; and reporting the summary of the events.

In a feature of this aspect, the events within the tenant comprise: errors; warnings; exceptions; object state changes; failures; manually triggered actions; and automatically triggered actions.

In a feature of this aspect, aggregating the summary of the events comprises determining the amount of events of the same type; and determining the amount of events of the same severity.

In a feature of this aspect, reporting the summary of the events comprises visual notifications; text notifications; notification messages; color coding; and shape coding.

Another aspect relates to a method for controlling the tenant operational state in a multi-tenant data protection application. The method includes disabling the operation of a tenant; enabling the operation of a tenant; monitoring tenant operational state; and reporting tenant operational state.

In a feature of this aspect, disabling the operation of a tenant comprises disabling user interface for the tenant.

In a feature of this aspect, disabling the operation of a tenant comprises stopping all activities related to the tenant.

In a feature of this aspect, disabling the operation of a tenant comprises closing the private database of the tenant.

In a feature of this aspect, enabling the operation of a tenant comprises opening the private database of the tenant.

In a feature of this aspect, enabling the operation of a tenant comprises starting activities related to the tenant.

In a feature of this aspect, enabling the operation of a tenant comprises enabling user interface for the tenant.

Another aspect relates to a method for configuring a tenant of the multi-tenant data protection application. The method includes tenant parameters specification; tenant resources allocation; tenant resources association; and tenant permissions configuration.

In a feature of this aspect, tenant parameters comprise a tenant name.

In a feature of this aspect, tenant parameters comprise tenant contact information.

In a feature of this aspect, tenant resource allocation comprises allocation of licenses.

In a feature of this aspect, tenant resource allocation comprises allocation of compute resources.

In a feature of this aspect, tenant resource allocation comprises allocation of storage resources.

In a feature of this aspect, tenant resource allocation comprises allocation of networking resources.

In a feature of this aspect, tenant resource association comprises association of data protection engine with the tenant.

In a feature of this aspect, tenant resource association comprises association of redundant data storage with the tenant.

In a feature of this aspect, tenant resource association comprises association of computing infrastructure with the tenant.

In a feature of this aspect, tenant permissions configuration comprises creation of user accounts.

In a feature of this aspect, tenant permissions configuration comprises management of user accounts.

In a feature of this aspect, tenant permissions configuration comprises management of user roles.

In a feature of this aspect, tenant permissions configuration comprises management of user groups.

In a feature of this aspect, tenant permissions configuration comprises management of access to certain functional areas.

In a feature of this aspect, tenant permissions configuration comprises enabling or disabling user accounts.

Another aspect relates to a method for managing tenants of the multi-tenant data protection application, the method comprising application-wide super user account managing tenants and tenant level user accounts.

In a feature of this aspect, the super user account is configured to create tenants; configure tenants; modify tenants; and remove tenants.

In a feature of this aspect, the super user account is configured to disable tenant operation; and enable tenant operation.

In a feature of this aspect, the super user account is configured to: create tenant level user accounts; modify tenant level user accounts; remove tenant level user accounts; disable tenant level user accounts; and enable tenant level user accounts.

In a feature of this aspect, the super user account is configured to view a user interface of a tenant; make changes to the user interface of a tenant; trigger actions within the user interface of a tenant; view configuration of a tenant; and modify configuration of a tenant.

In addition to the aforementioned aspects and features of the present invention, it should be noted that the present invention further encompasses the various possible combinations and subcombinations of such aspects and features. Thus, for example, any aspect may be combined with an aforementioned feature in accordance with the present invention without requiring any other aspect or feature.

The subject matter described herein may be implemented as a computer controlled apparatus, a computer process, a computing system, a computer program, or as an article of manufacture such as a computer-readable medium, and aspects and features relate to such implementations.

BRIEF DESCRIPTION OF THE DRAWINGS

One or more preferred embodiments of the present invention now will be described in detail with reference to the accompanying drawings, wherein the same elements are referred to with the same reference numerals, and wherein.

DETAILED DESCRIPTION

Figure 1:
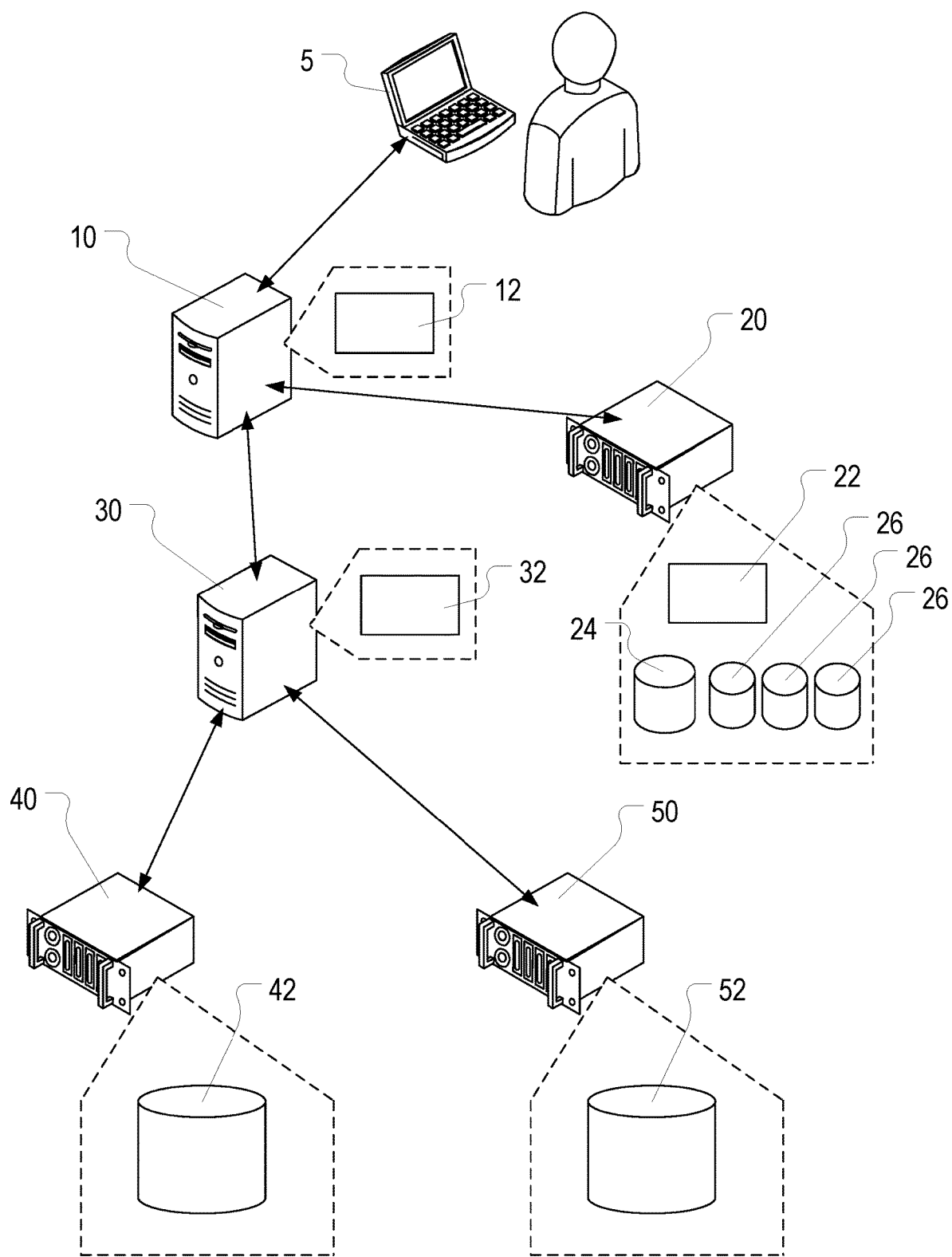
FIG. 1 illustrates components of a system in accordance with one or more preferred implementations.

As a preliminary matter, it will readily be understood by one having ordinary skill in the relevant art ("Ordinary Artisan") that the present invention has broad utility and application. As should be understood, any embodiment may incorporate only one or a plurality of the above-disclosed aspects of the invention and may further incorporate only one or a plurality of the above-disclosed features. Furthermore, any embodiment discussed and identified as being "preferred" is considered to be part of a best mode contemplated for carrying out the present invention. Other embodiments also may be discussed for additional illustrative purposes in providing a full and enabling disclosure of the present invention. As should be understood, any embodiment may incorporate only one or a plurality of the above-disclosed aspects of the invention and may further incorporate only one or a plurality of the above-disclosed features. Moreover, many embodiments, such as adaptations, variations, modifications, and equivalent arrangements, will be implicitly disclosed by the embodiments described herein and fall within the scope of the present invention.

Accordingly, while the present invention is described herein in detail in relation to one or more embodiments, it is to be understood that this disclosure is illustrative and exemplary of the present invention, and is made merely for the purposes of providing a full and enabling disclosure of the present invention. The detailed disclosure herein of one or more embodiments is not intended, nor is to be construed, to limit the scope of patent protection afforded the present invention in any claim of a patent issuing here from, which scope is to be defined by the claims and the equivalents thereof. It is not intended that the scope of patent protection afforded the present invention be defined by reading into any claim a limitation found herein that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the present invention. Accordingly, it is intended that the scope of patent protection afforded the present invention is to be defined by the issued claim(s) rather than the description set forth herein.

Additionally, it is important to note that each term used herein refers to that which the Ordinary Artisan would understand such term to mean based on the contextual use of such term herein. To the extent that the meaning of a term used herein—as understood by the Ordinary Artisan based on the contextual use of such term—differs in any way from any particular dictionary definition of such term, it is intended that the meaning of the term as understood by the Ordinary Artisan should prevail.

Regarding applicability of 35 U.S.C. 112, paragraph 6 or subsection (f), no claim element is intended to be read in accordance with this statutory provision unless the explicit phrase "means for" or "step for" is actually used in such claim element, whereupon this statutory provision is intended to apply in the interpretation of such claim element.

Furthermore, it is important to note that, as used herein, "a" and "an" each generally denotes "at least one," but does not exclude a plurality unless the contextual use dictates otherwise. Thus, reference to "a picnic basket having an apple" describes "a picnic basket having at least one apple" as well as "a picnic basket having apples." In contrast, reference to "a picnic basket having a single apple" describes "a picnic basket having only one apple."

When used herein to join a list of items, "or" denotes "at least one of the items," but does not exclude a plurality of items of the list. Thus, reference to "a picnic basket having cheese or crackers" describes "a picnic basket having cheese without crackers", "a picnic basket having crackers without cheese", and "a picnic basket having both cheese and crackers." Finally, when used herein to join a list of items, "and" denotes "all of the items of the list." Thus, reference to "a picnic basket having cheese and crackers" describes "a picnic basket having cheese, wherein the picnic basket further has crackers," as well as describes "a picnic basket having crackers, wherein the picnic basket further has cheese."

As used herein, the term "tenant", unless otherwise specified, refers to a client, organization, organizational unit, or a user, that uses an application or system in accordance with one or more implementations. This term can be exemplified by clients of a service provider, organizational units of an enterprise, and the like.

As used herein, the term "data protection", unless otherwise specified, refers to a process of protecting original data against accidental loss (e.g. in case of disaster). This term can be exemplified by backing up the data, replicating the data, and the like activities.

As used herein, the term "redundant copy of data", "redundant copy" or "redundant data", unless otherwise specified, refers to a copy of original data, such as a mirror copy, image level copy, file level copy, file system level copy, application level copy, database level copy, block level copy or byte level copy of the original data, which is purposed to keep and restore data in case of original data loss. This term can be exemplified by data backups, data replicas, mirror copies of data, and the like.

As used herein, the term "data protection engine" or "data protection engine module", unless otherwise specified, refers to computer implemented methods and processes of a system described herein, which is intended to read, transfer and write data, process data, create, maintain and delete redundant copies of data, and maintain redundant data storage. A data protection engine may be run by one or more computer processors.

As used herein, the term "redundant data storage" or "redundant copy storage", unless otherwise specified, refers to a data storage device or medium, such as magnetic devices or medium, semiconductor devices or medium, optical devices or medium, and the like, used to store redundant copies of data. This can be exemplified by hard disk, magnetic tape, optical disk, solid state drive, and the like. The term may also refer to a capacity of the medium used to store redundant copies of data.

As used herein, the term "user interface" or "user interface module", unless otherwise specified, refers to a component or components of the system as described herein, intended to transfer user requests, respond to the requests and provide users with access to the application.

As used herein, the term "business logic" or "business logic module", unless otherwise specified, refers to a component of a system described herein, which is intended to provide tenant management and separation, as well as logic for management of the processes related to redundant copies of data. In some examples, the "business logic" may comprise means for managing tenants of a multi-tenant data protection application, tenant resource allocation and isolation of tenant operating environments.

As used herein, the term "database server" or "database server module", unless otherwise specified, refers to a component of the system as described herein, which is intended to perform creation, querying, update, administration and removal of databases. This term can also refer to a third-party database management system used by the application.

As used herein, the term "tenant status", "general tenant status", "status of the tenant" or "general status of the tenant", unless otherwise specified, refers to a status of activities and data within the tenant, which can be aggregated and summarized in a central management point of the system.

As used herein, the term "tenant operational state", "tenant operation" or "operational state of the tenant", unless otherwise specified, refers to whether the tenant is enabled, i.e. running and consuming resources, or disabled, i.e. not running and not consuming resources. This term can be exemplified by a computer power state (powered on or powered off) or an engine state (started or not started).

As used herein, the term "computer" refers to a machine, apparatus, or device that is capable of accepting and performing logic operations from software code. The term "software", "software code", "computer software", "computer application", or "application" refers to any set of instructions operable to cause a computer to perform an operation. Software code may be operated on by a "rules engine" or processor. Methods and systems in accordance with one or more preferred implementations may be performed by a computer based on instructions received by computer software.

As used herein, the term "client device" or "client computer" may refer to a type of computer operated by a person. Non-limiting examples of client devices include: personal computers (PCs), workstations, laptops, tablet PCs such as an iPad, cell phones including iOS phones made by Apple Inc., Android OS phones, Microsoft OS phones, Blackberry phones, or generally any electronic device capable of running computer software and displaying information to a user. Certain types of client devices which are portable and easily carried by a person from one location to another may sometimes be referred to as a "mobile device". Some non-limiting examples of mobile devices include; cell phones, smart phones, tablet computers, laptop computers, wearable computers such as watches, Google Glasses, etc. and the like.

As used herein, the term "network", "data network" or "computer network" shall mean an infrastructure capable of connecting two or more computers such as client devices either using wires or wirelessly allowing them to transmit and receive data. Non-limiting examples of computer networks may include the intranet, internet, wired networks, or wireless networks which may include WiFi and cellular networks.

As used herein, the term "database" shall generally mean a digital collection of data or information. One or more preferred implementations utilize novel methods and processes to store, link, and modify information such as tenant data or configuration data. In one or more preferred implementations, a database may be stored on a remote server and accessed through a computer network, such as local network or internet (i.e., the database is in the cloud) or alternatively in some embodiments a database may be stored on a local or remote computer.

The present disclosure is to be considered as an exemplification of one or more preferred implementations, and is not intended to limit the invention to the specific embodiments illustrated by the figures or described herein.

One or more preferred implementations relate to technologies, computer implemented methods and systems for providing a multi-tenant data protection application.

Through the use of such a system, each tenant of a multi-tenant data protection application is assigned a private per-tenant database that is utilized to store configuration data that is unique to the tenant. General, application-wide data and configuration is kept in a master database. In this way, individual tenant data is kept private from other tenants.

Technologies and computer implemented methods and systems are described herein for providing a multi-tenant data protection application that utilizes a master database and a shared user interface in conjunction with per-tenant databases, tenant-associated data protection engines and tenant-associated redundant data storage. Through the utilization of aspects presented herein, in one or more preferred implementations, a multi-tenant data protection application can keep individual tenant configuration, data and redundant copies private from other tenants and monitor a status of the tenants.

Moreover, through the use of aspects described herein, in one or more preferred implementations, a multi-tenant data protection application can be implemented in a way that does not require a separate virtual or physical server computer for each of the tenants and that efficiently utilizes available hardware and software resources.

According to aspects presented herein, in one or more preferred implementations, a multi-tenant data protection application is provided that supports concurrent use by multiple tenants. The application may be running on a physical or virtual computer as well as on multiple computers.

In one or more preferred implementations, a multi-tenant data protection application creates redundant copies of data and provides tenants with management and access to the redundant copies.

In one or more preferred embodiments, the multi-tenant data protection application is provided through the use of a user interface, business logic, database servers, databases, data protection engines and redundant data storage. In some embodiments, a user interface and business logic are shared by the tenants of the multi-tenant data protection application and private databases are not shared by tenants. The user interface operates in conjunction with the business logic. The business logic operates in conjunction with the user interface and the database server. The database server operates in conjunction with the business logic. Data protection engines operate in conjunction with the business logic and redundant data storage. Data protection engines and redundant data storage may be shared by multiple tenants as well as operate separately on a per tenant basis.

In one or more preferred embodiments, a private tenant database is created for each tenant. Each tenant database may be associated with a particular tenant and is inaccessible to the other tenants.

The tenant databases are utilized to store application data for an associated tenant, along with any customizations to the application implemented by the tenant. In one or more preferred implementations, the tenant database may be implemented as a structured query language ("SQL") database maintained by a SQL server database application.

In one or more preferred embodiments, a common master database is also utilized. The master database stores configuration data, user data and management data. When a request is received from a tenant to access the multi-tenant data protection application, the master database is utilized to identify the user data and locate the private tenant database associated with the tenant making the request.

When a new tenant is provisioned, configured or reconfigured, the tenant may be provided with certain allocated resources, including, but not limited to: software license units, redundant data storage space, data protection engines, network bandwidth, CPU, RAM, etc. User data and management data for the tenant may also be created within the master database.

When a request is received from a certain tenant to access the multi-tenant data protection application, the master database may be queried to identify the user data and locate a tenant database for the current tenant.

In some embodiments, the operational state of each tenant and current status of the tenant are monitored. If a particular tenant is not operational due to any reason, the multi-tenant data protection application may report the current operational state of such tenant in the form of visual or messaging notification. If the current status of the tenant is changed, the multi-tenant data protection application may report the current status of the tenant in the form of visual or messaging notification.

In one or more preferred implementations, a multi-tenant data protection application utilizes data protection engines and redundant data storage to deliver application functionality to tenants.

Tenants may use one or more data protection engines in conjunction with redundant data storage to create, store, manage and access redundant copies of data.

Referring now to the drawings, one or more preferred embodiments of the present invention are next described. The following description of one or more preferred embodiments is merely exemplary in nature and is in no way intended to limit the invention, its implementations, or uses.

FIG. 1 illustrates components of a system in accordance with one or more preferred implementations. The system allows a user to access a data protection application via a computer 5 and utilize the data protection application to manage the protection of data stored in a database 42 at a remote computer 40.

The user is a user associated with a tenant. The system includes a database server 20 including a master database 24 containing data for a plurality of tenants. The database server 20 further includes a plurality of tenant databases 26. The tenant databases 26 store, inter alia, information (e.g. metadata) related to data that is to be protected by the application. For example, a tenant database 26 might store information corresponding to a location and access credentials for the database 42. The database server 20 includes a database server module 22 which manages the databases of the database server 20.

The system further includes a data protection computer 30 which includes a data protection engine 32 configured to protect data. For example, to protect original data stored at the database 42, the data protection engine 32 might copy the original data to redundant data storage for that tenant in the form of tenant redundant data store 52 on a redundant storage server 50.

The data protection engine 32 provides functionality for creating, maintaining, accessing, synchronizing and updating one or more redundant copies of data. According some embodiments herein, the data protection engine module 32 operates with tenant redundant data store 52. Tenant redundant data store 52 is utilized to store redundant copies of data.

The system further includes a data protection application server 10 that is configured to allow a user to manage data protection services for a tenant. The data protection application server 10 includes a business logic module 12 which interfaces with the database server module 22 and data protection engine 32 and manages data protection.

Figure 2:
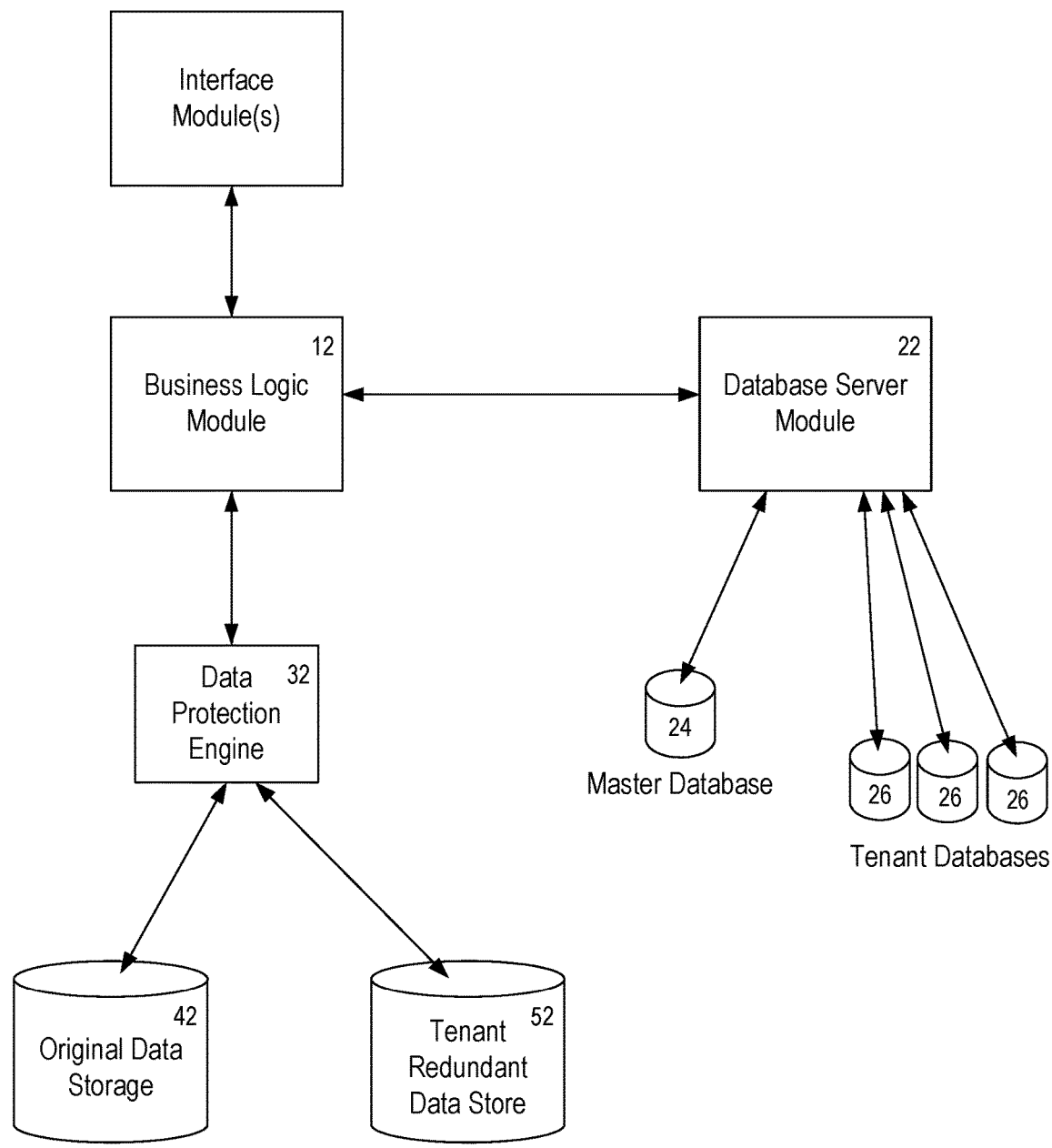
FIG. 2 provides a logical overview of interaction between components of the system of FIG. 1.

FIG. 2 provides a logical overview of interaction between components of the system of FIG. 1. Data protection engine 32 is executing on the data protection engine computer 30 and is utilized to access original data on the original data storage 42 and create a redundant copy of the original data at the tenant redundant data storage 52. Data protection engine 32, original data storage 42, and redundant data store 52 can be shared between tenants or private within a tenant.

Figure 3:
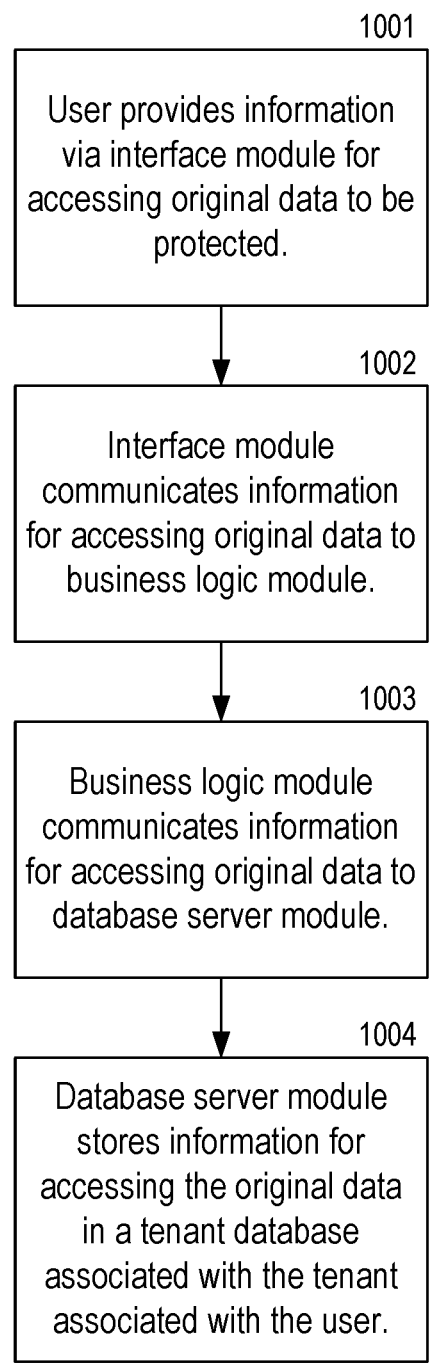
FIG. 3 is a flow of an exemplary methodology of use of the system of FIGS. 1-2 by a user to provide information regarding data to be protected.
Figure 5:
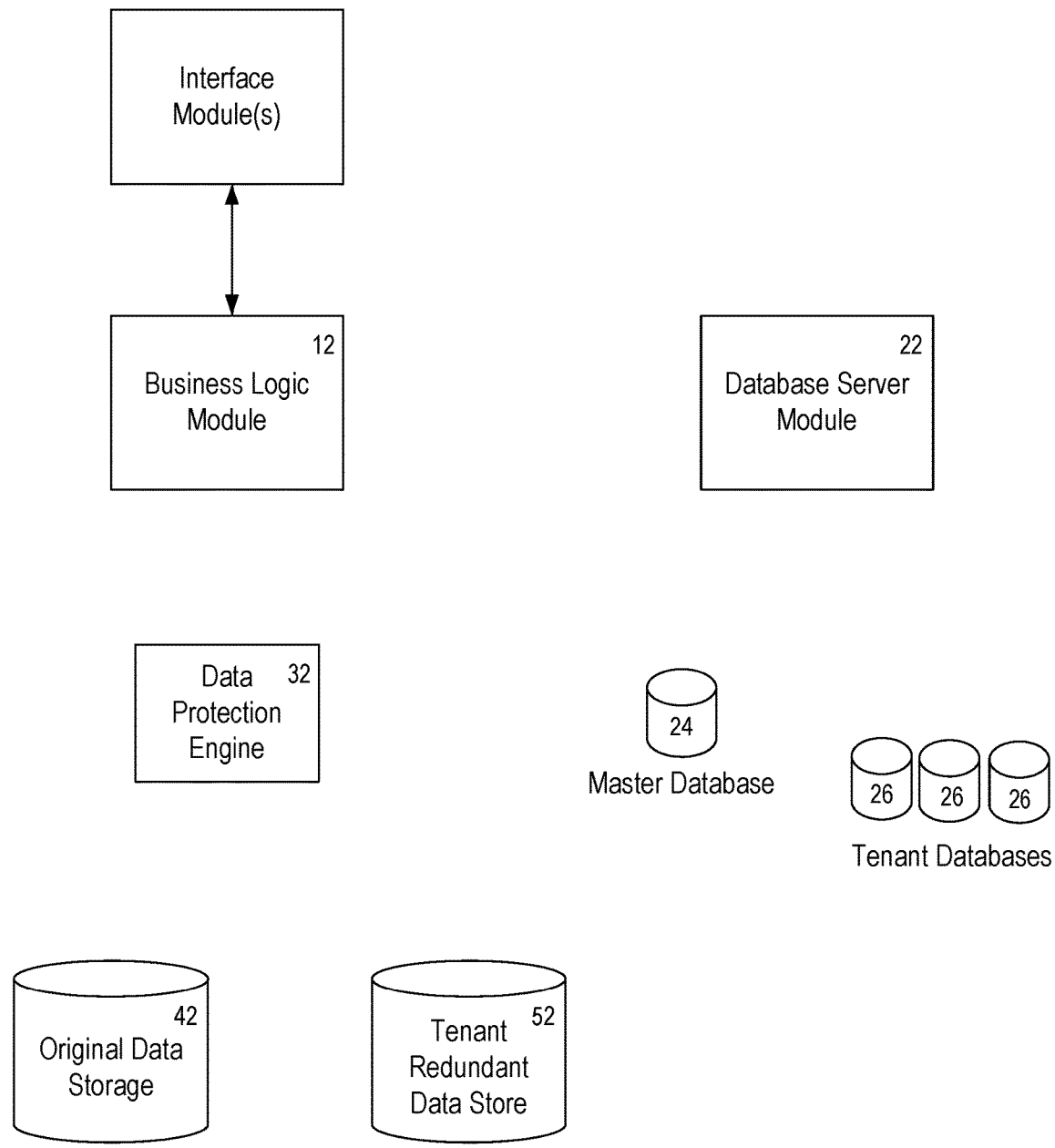
FIGS. 5-6 illustrate steps of the flow of FIG. 3.
Figure 6:
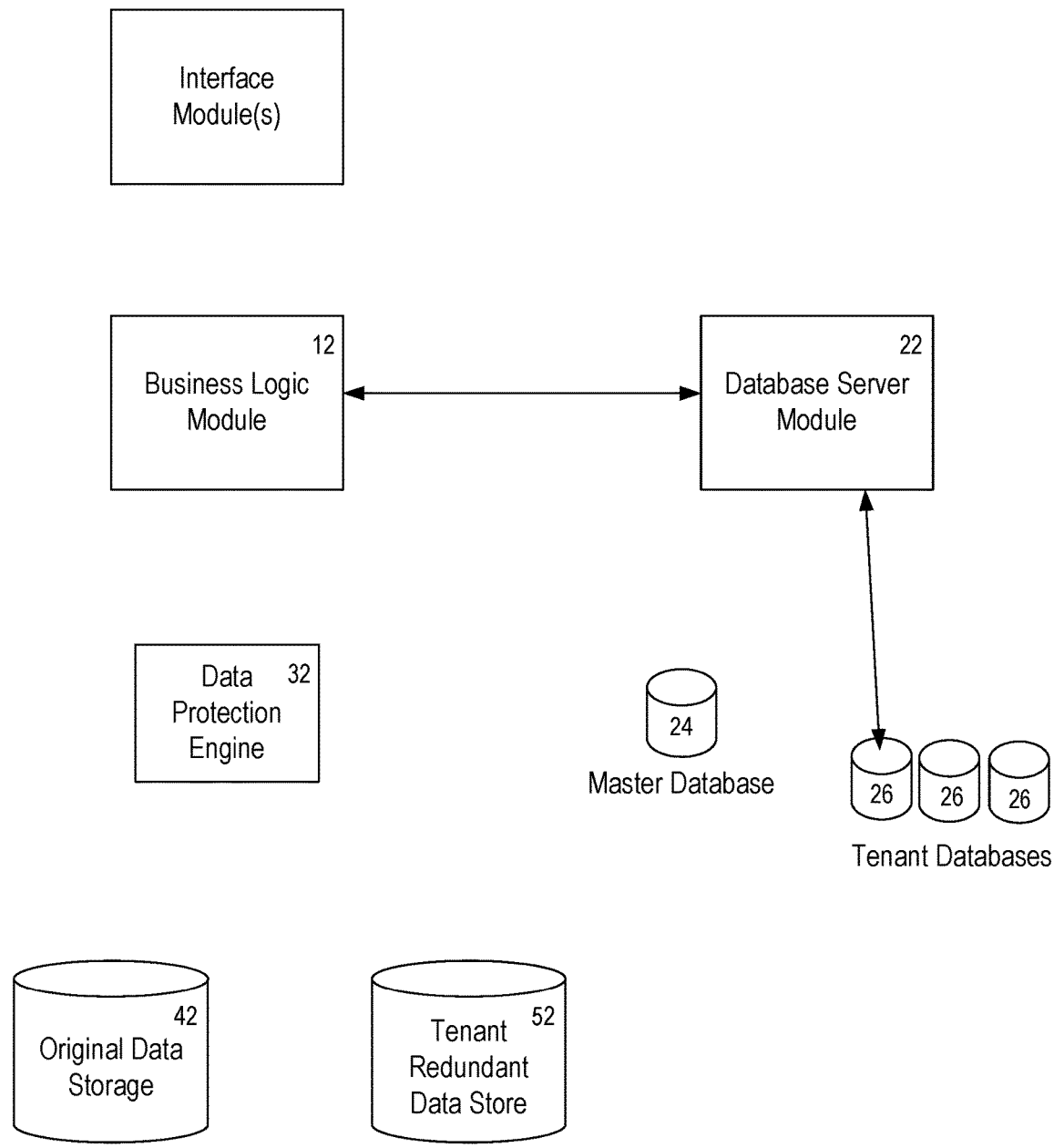

FIG. 3 is a flow of an exemplary methodology of use of the system by a user to provide information regarding data to be protected. In accordance with such flow, first at step 1001, a user provides information via an interface module for accessing original data to be protected. Next, at step 1002, the interface module communicates information for accessing original data to the business logic module 12, as illustrated in FIG. 5. At step 1003, the business logic module 12 communicates information for accessing the original data to the database server module 22, as illustrated in FIG. 6. At step 1004, the database server module 22 stores information for accessing the original data in a tenant database 26 associated with the tenant associated with the user. In one or more preferred implementations, the system might look up tenant information associated with the user in the master database 24.

Figure 4:
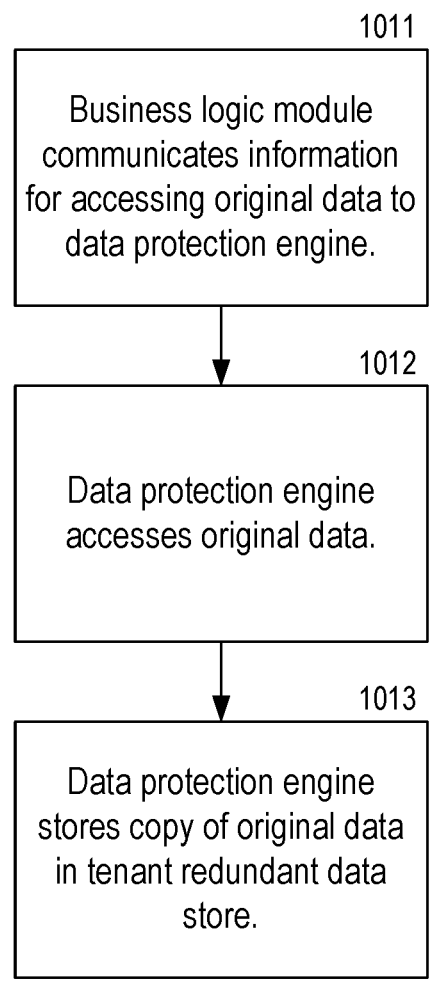
FIG. 4 is a flow of an exemplary methodology in which the system utilizes a data protection engine to protect original data.
Figure 7:
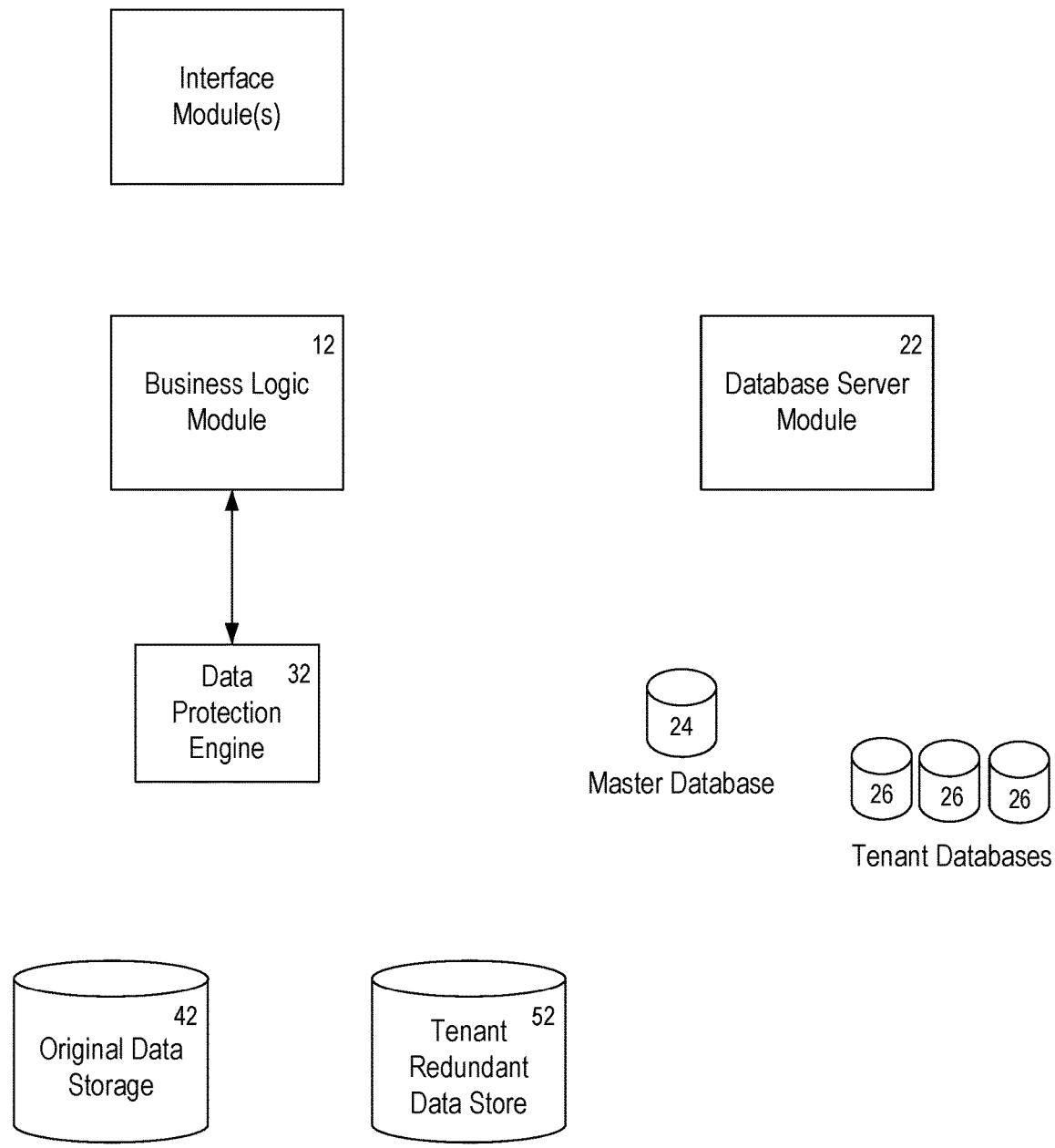
FIGS. 7-9 illustrate steps of the flow of FIG. 4.
Figure 8:
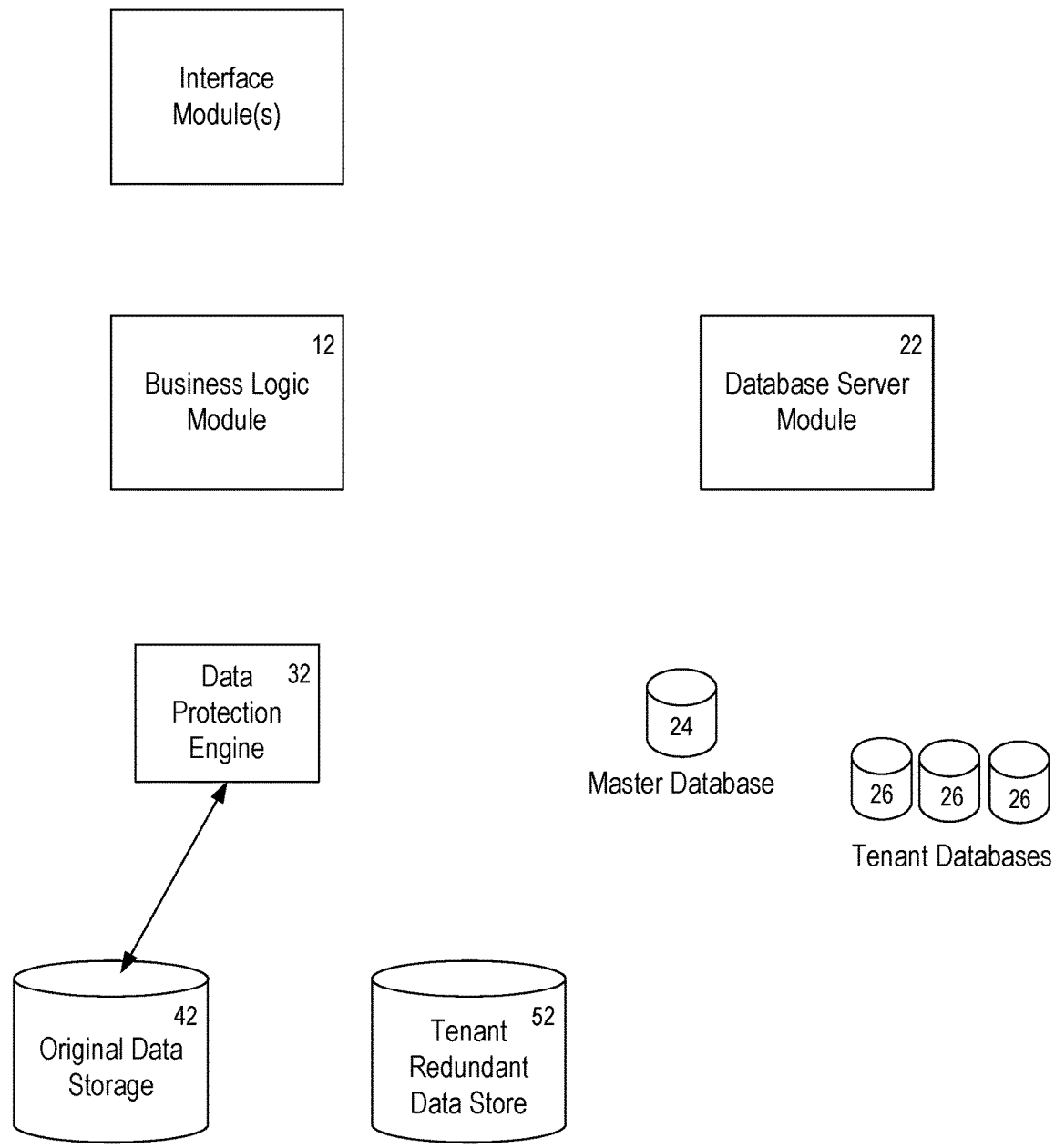
Figure 9:
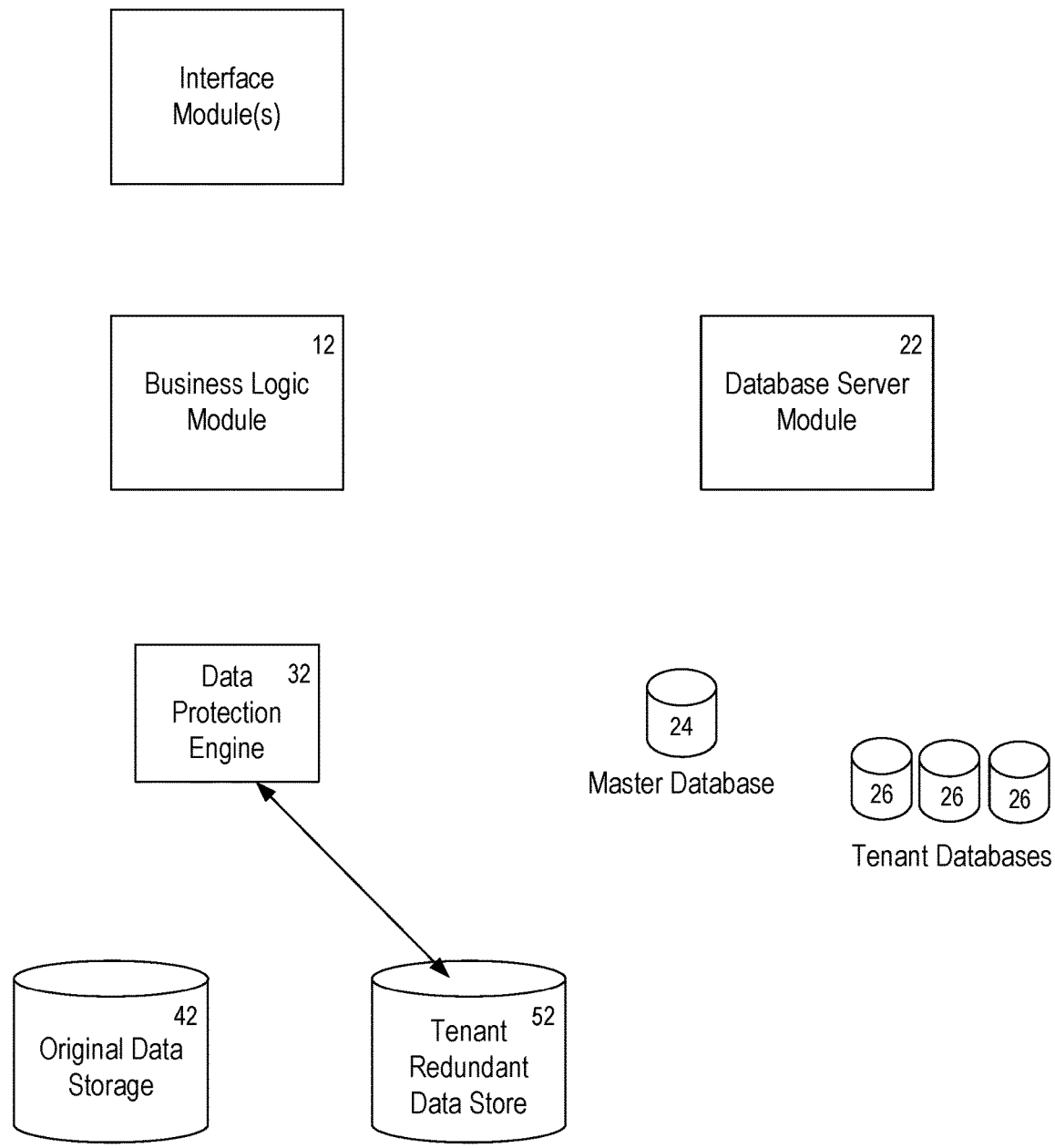

FIG. 4 is a flow of an exemplary methodology in which the system utilizes a data protection engine to protect original data. In one or more preferred implementations, this methodology may involve looking up, by a business logic module from a tenant database, information regarding original data. In the methodology, at step 1011, the business logic module 12 communicates information for accessing original data to the data protection engine 32, as illustrated in FIG. 7. At step 1012, the data protection engine 32 accesses original data from original data storage 42, as illustrated in FIG. 8. At step 1013, the data protection engine 32 stores a copy of the original data in the tenant redundant data store 52, as illustrated in FIG. 9.

In one or more preferred implementations, a data protection engine might compress and/or deduplicate a copy of data before storing it in a tenant redundant data store.

Figure 10:
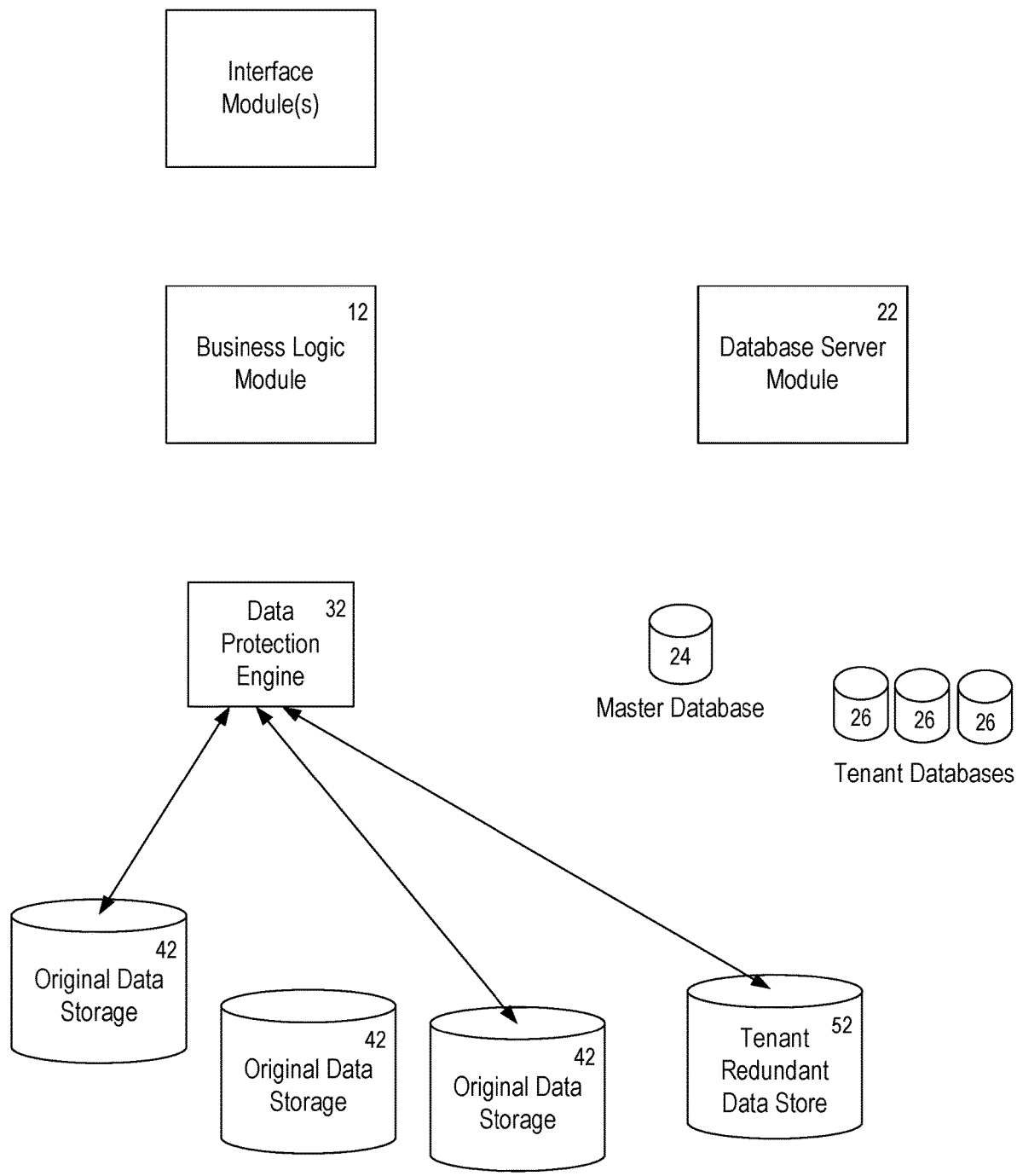
FIG. 10 illustrates the accessing of data from multiple data sources and storing that data in a tenant redundant data store.

Sometimes, a user might have multiple sources of original data that is to be protected. In accordance with one or more preferred implementations, a methodology involves accessing data for a tenant from a plurality of sources 42, and storing the data in a tenant redundant data store 52, as illustrated in FIG. 10.

Although thus far described in the context of a single user representing a single tenant wishing to protect data, in accordance with one or more preferred implementations, multiple organizations or business units of the same organization, which may be characterized as "tenants," may concurrently utilize the resources provided and utilized by a system.

The database server module 22 operates in conjunction with the business logic module 12 and manages the master database 24 and tenant databases 26.

Through the use of the database server module 22, the multi-tenant data protection application is operative to maintain one or more databases. In particular, the multitenant data protection application maintains a master database 24. The master database 24 is utilized to keep configuration data, monitoring data and tenant user management data. It may also be used to store additional information about tenants or data that is shared by tenants. In one implementation presented herein, the master database 24 is utilized to store data required to perform user authentication.

The multi-tenant data protection application also maintains a plurality of tenant databases 26. The tenant databases 26 are utilized by the multi-tenant data protection application to store data that is private within tenants. In preferred embodiments, each tenant database is associated with a certain tenant and its contents are not visible to the other tenants. According to aspects herein, each tenant database 26 is utilized to store private data for the associated tenant.

In one or more preferred implementations, a system is configured to provide data protection services to a plurality of tenants, manageable by a plurality of users, for protecting data in any number of disparate sources by copying original data to respective tenant redundant data storages.

Figure 11:
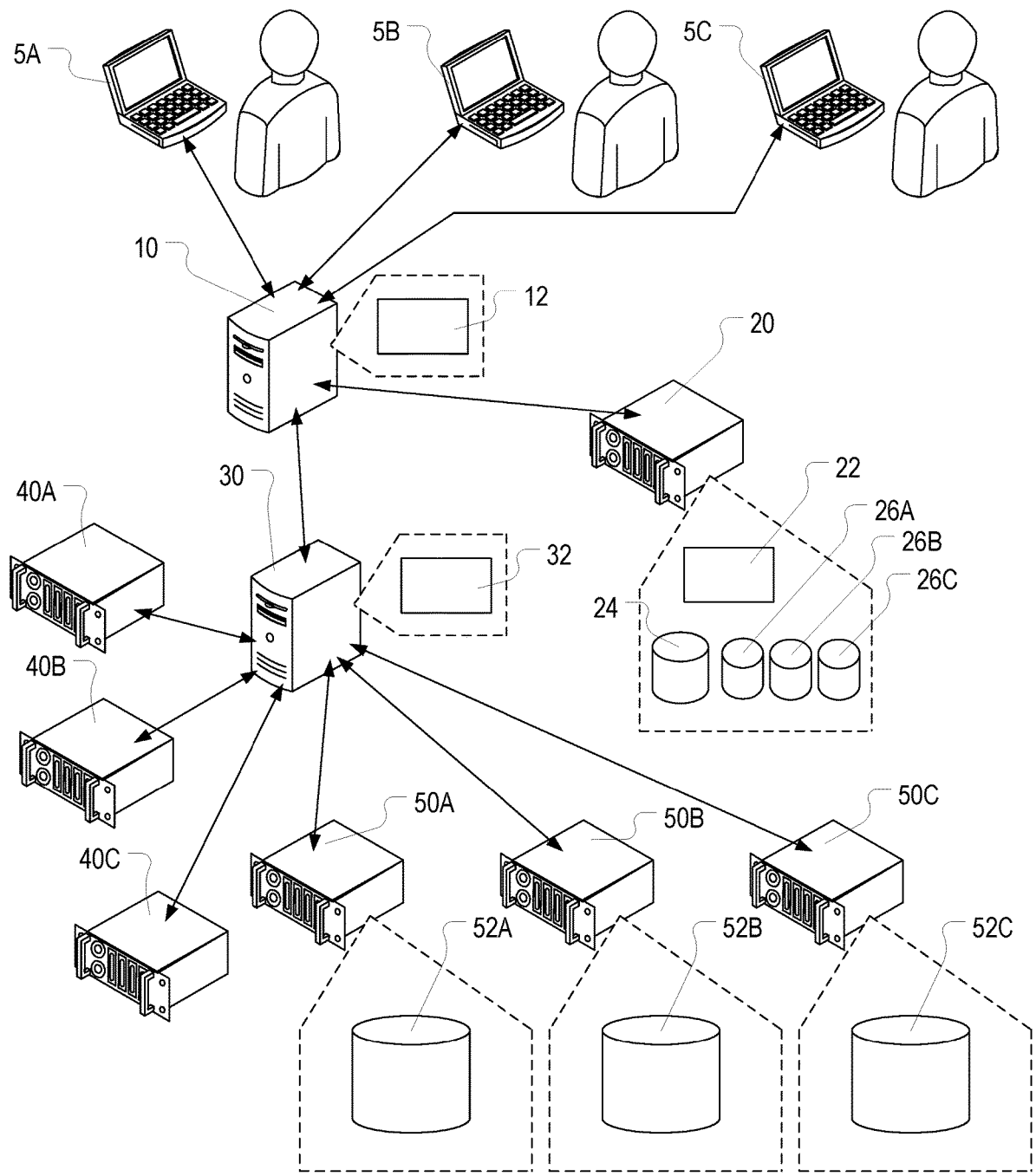
FIG. 11 illustrates an exemplary system in which three users, each associated with a different tenant, are managing data protection services for respective original data stored at disparate locations.

FIG. 11 illustrates an exemplary system in which three users, each associated with a different tenant, are managing data protection services for respective original data stored at disparate locations.

In particular, the system receives information from a first user via computer 5A that relates to original data for a first tenant stored at original data source 40A and stores such information in tenant database 26A associated with the first tenant. The system then uses such information to access the original data stored at original data source 40A and copy it to tenant redundant data store 52A associated with the first tenant at redundant storage server 50A.

Similarly, the system receives information from a second user via computer 5B that relates to original data for a second tenant stored at original data source 40B and stores such information in tenant database 26B associated with the second tenant. The system then uses such information to access the original data stored at original data source 40B and copy it to tenant redundant data store 52B associated with the second tenant at redundant storage server 50B.

Further, the system receives information from a third user via computer 5C that relates to original data for a third tenant stored at original data source 40C and stores such information in tenant database 26C associated with the third tenant. The system then uses such information to access the original data stored at original data source 40C and copy it to tenant redundant data store 52C associated with the third tenant at redundant storage server 50C.

Figure 12:
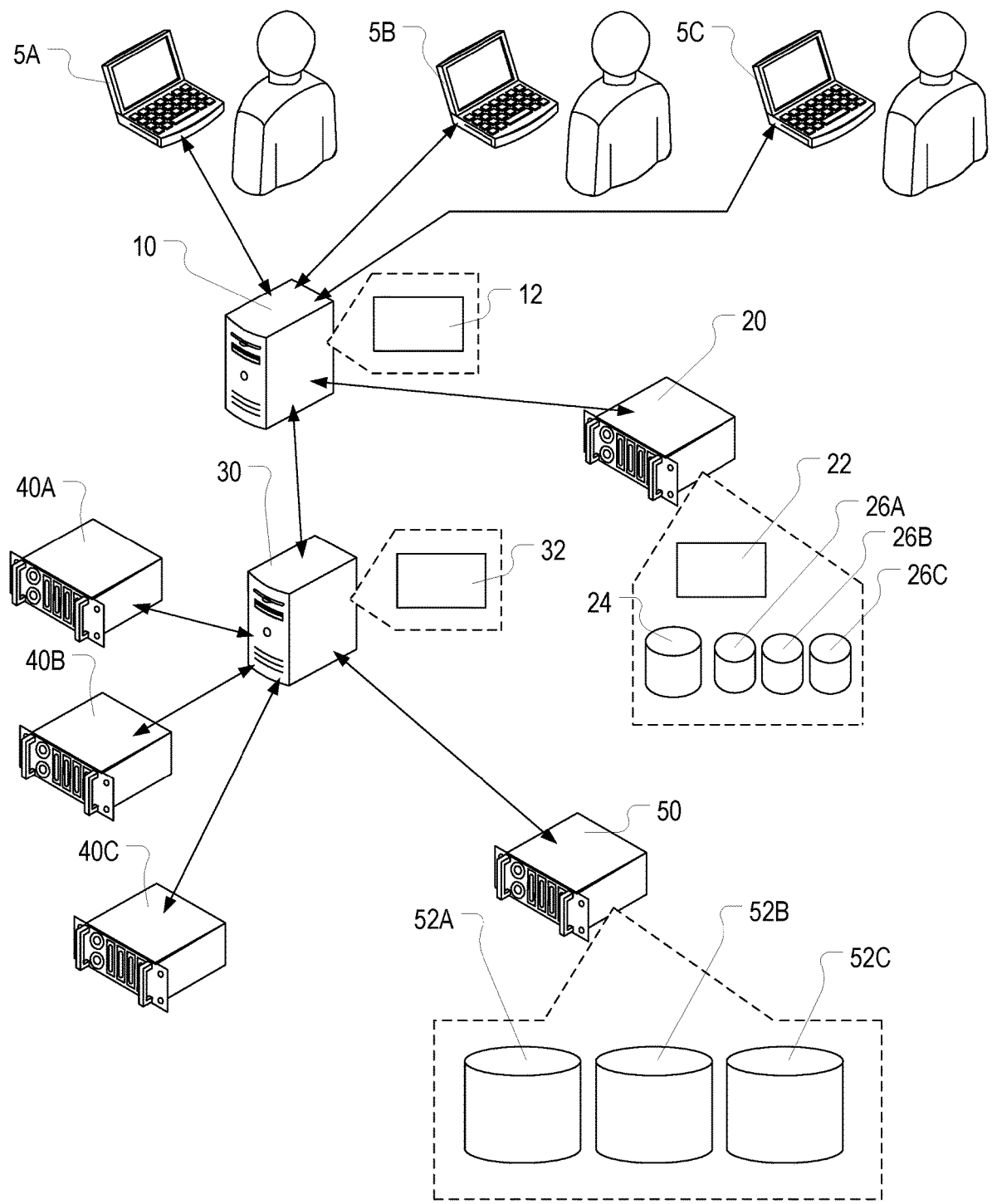
FIG. 12 illustrates the presence of multiple tenant redundant data stores at a single server.

In one or more preferred implementations, tenant redundant data stores are each located at a respective redundant storage server, as illustrated in FIG. 11, while in one or more preferred implementations two or more tenant redundant data stores may be located at a single redundant storage server, as illustrated in FIG. 12.

Figure 13:
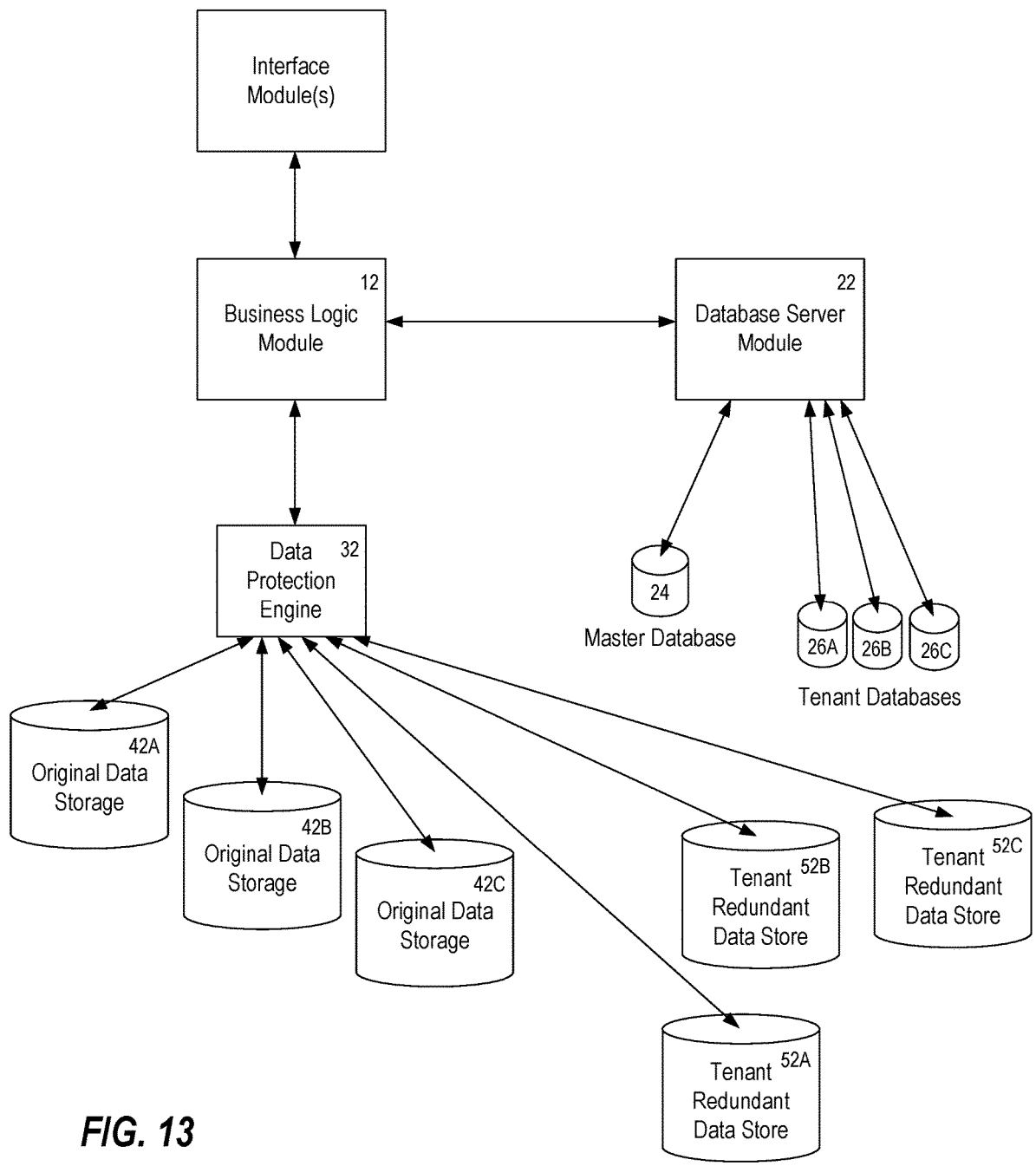
FIG. 13 provides a logical overview of interaction between components of the system of FIG. 11.

FIG. 13 provides a logical overview of interaction between components of the system of FIG. 11, illustrating the presence of multiple tenant protection data stores.

In one or more preferred implementations, the functionality provided by a multi-tenant data protection application may be accessed through the use of a client user interface module.

Figure 14:
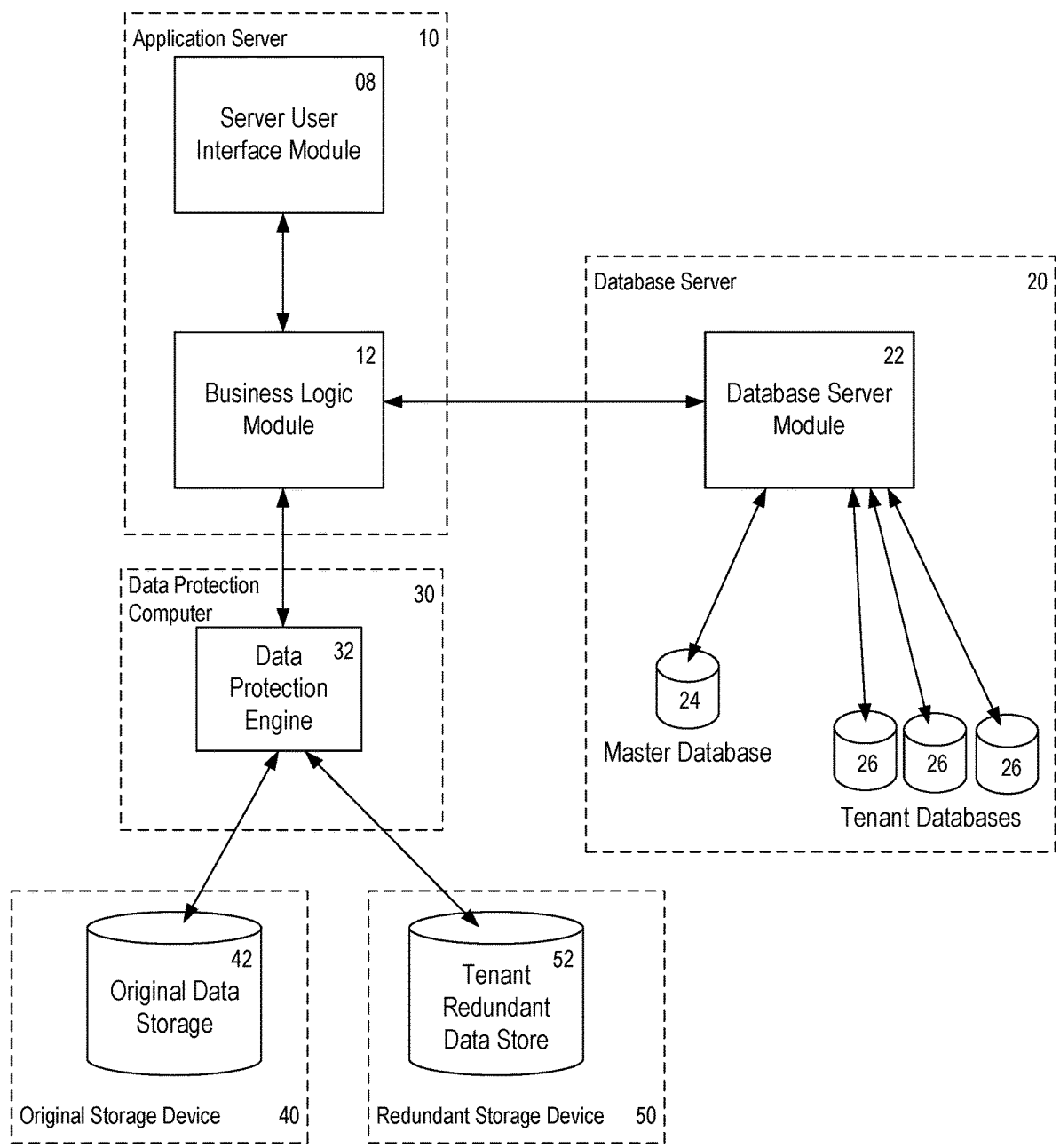
FIGS. 14-23 illustrates various architectures in accordance with one or more preferred implementations.
Figure 15:
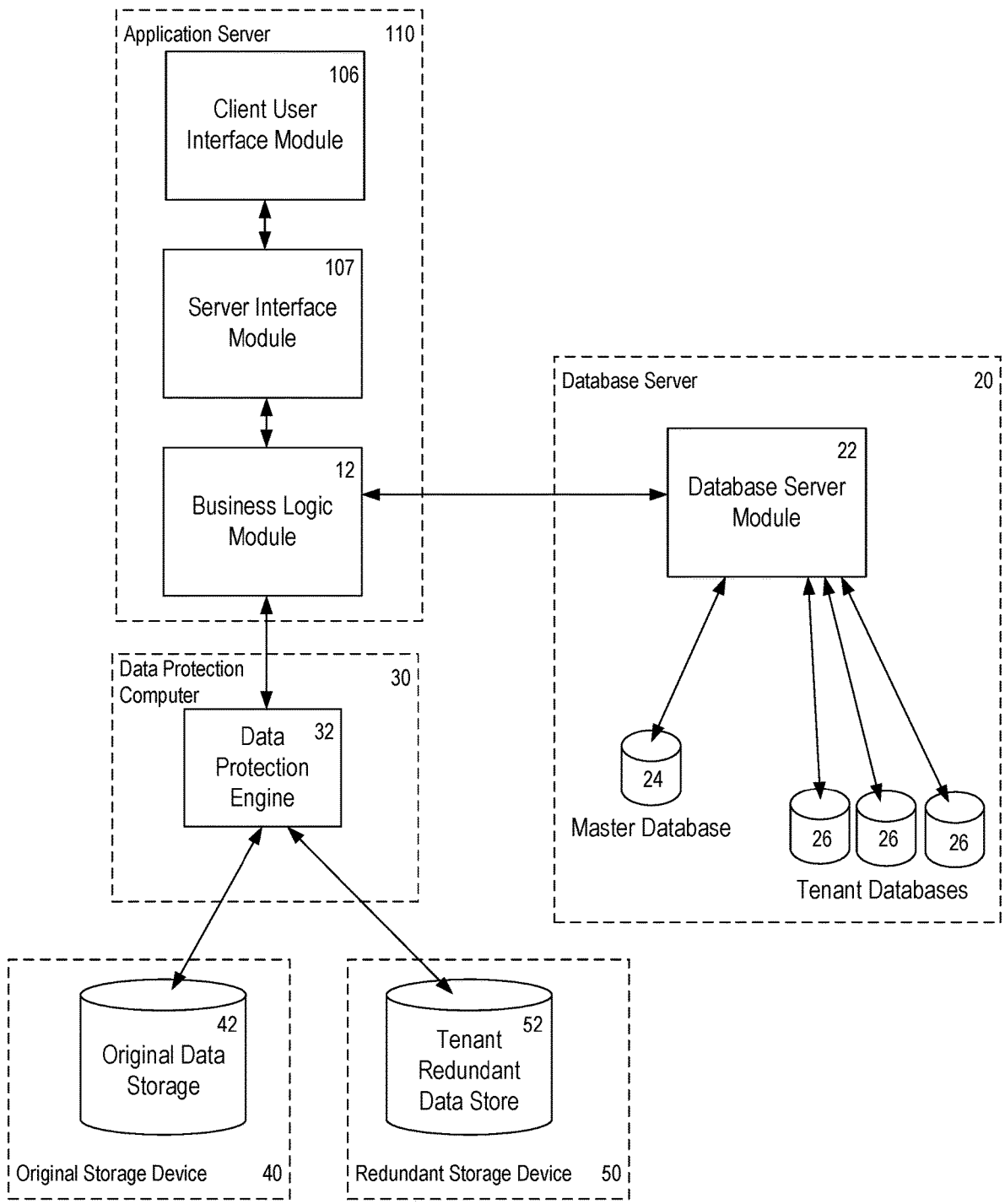

In one or more preferred implementations, a client user interface module operates in conjunction with a server user interface module 08 executing on an application server 10, as illustrated in FIG. 14. In this manner, a client computer or an application server can be utilized to access functionality provided by a multi-tenant data protection application.

Figure 16:
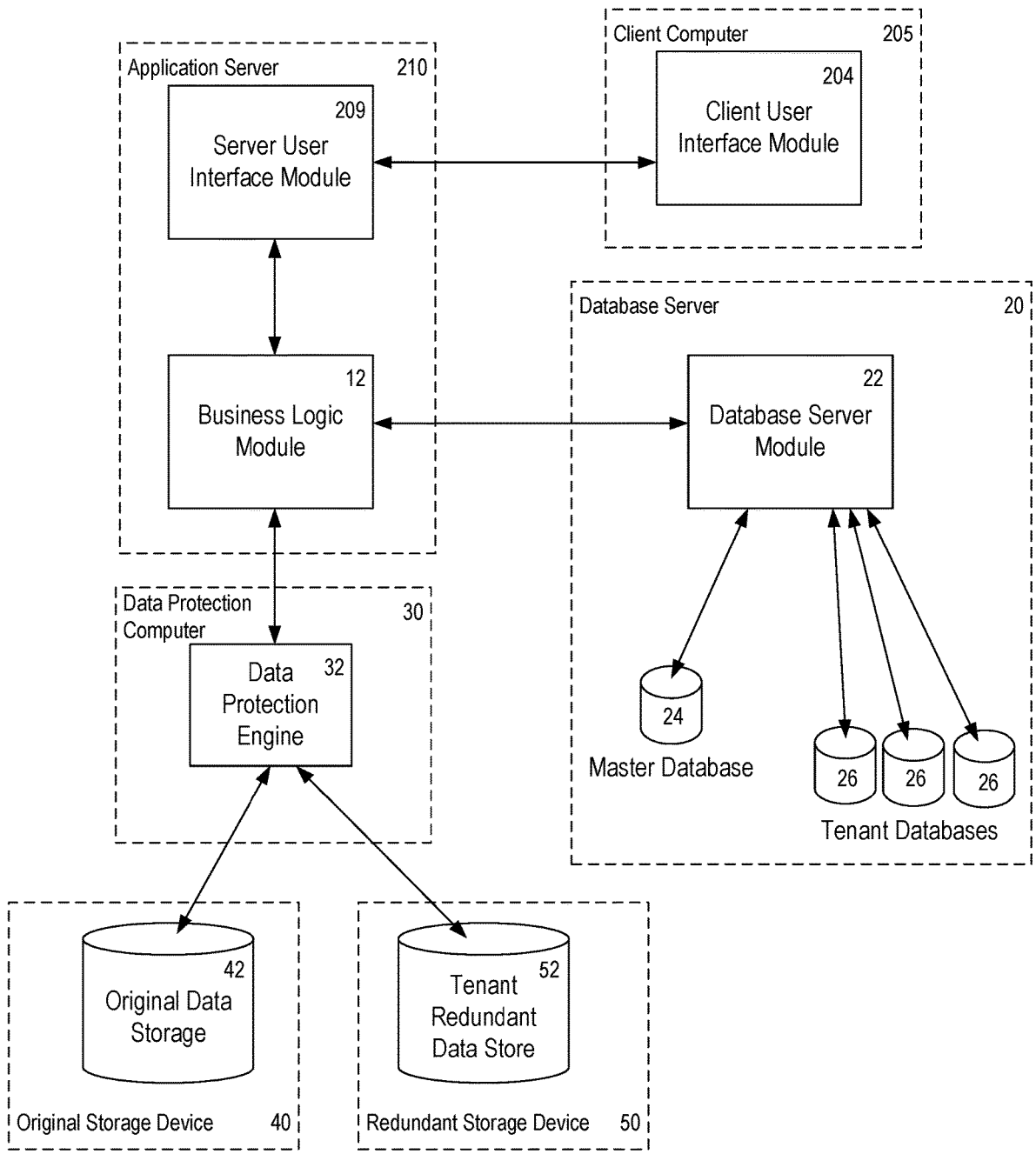
Figure 17:
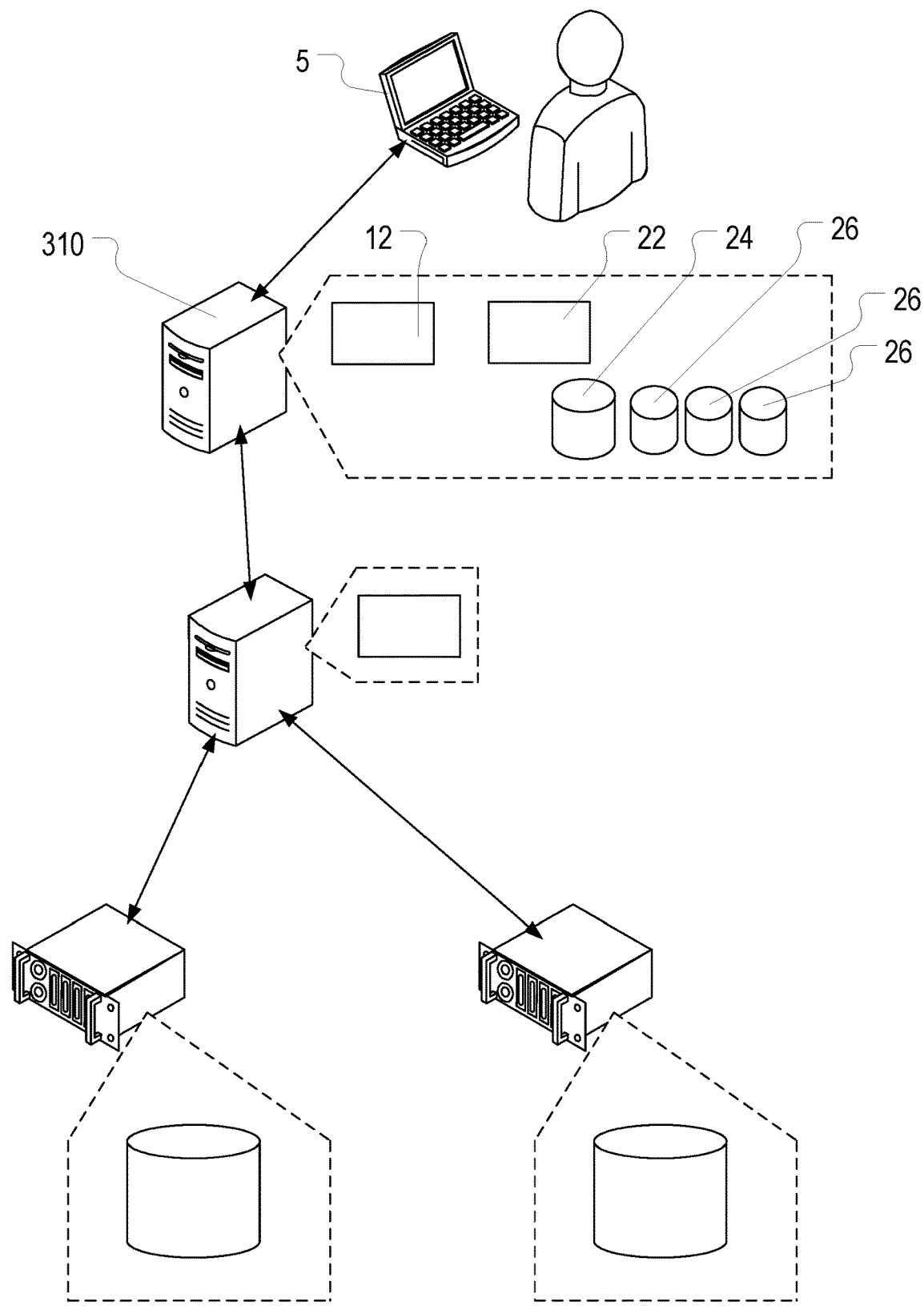

In one or more preferred implementations, a client user interface module is loaded on a client device such as a client computer (as exemplified by client user interface module 204 illustrated in FIG. 16) or on the same server computer (as exemplified by client user interface module 106 illustrated in FIG. 17). Such module can be a web browser, a desktop client application, a command line utility or other type of user interface.

Figure 18:
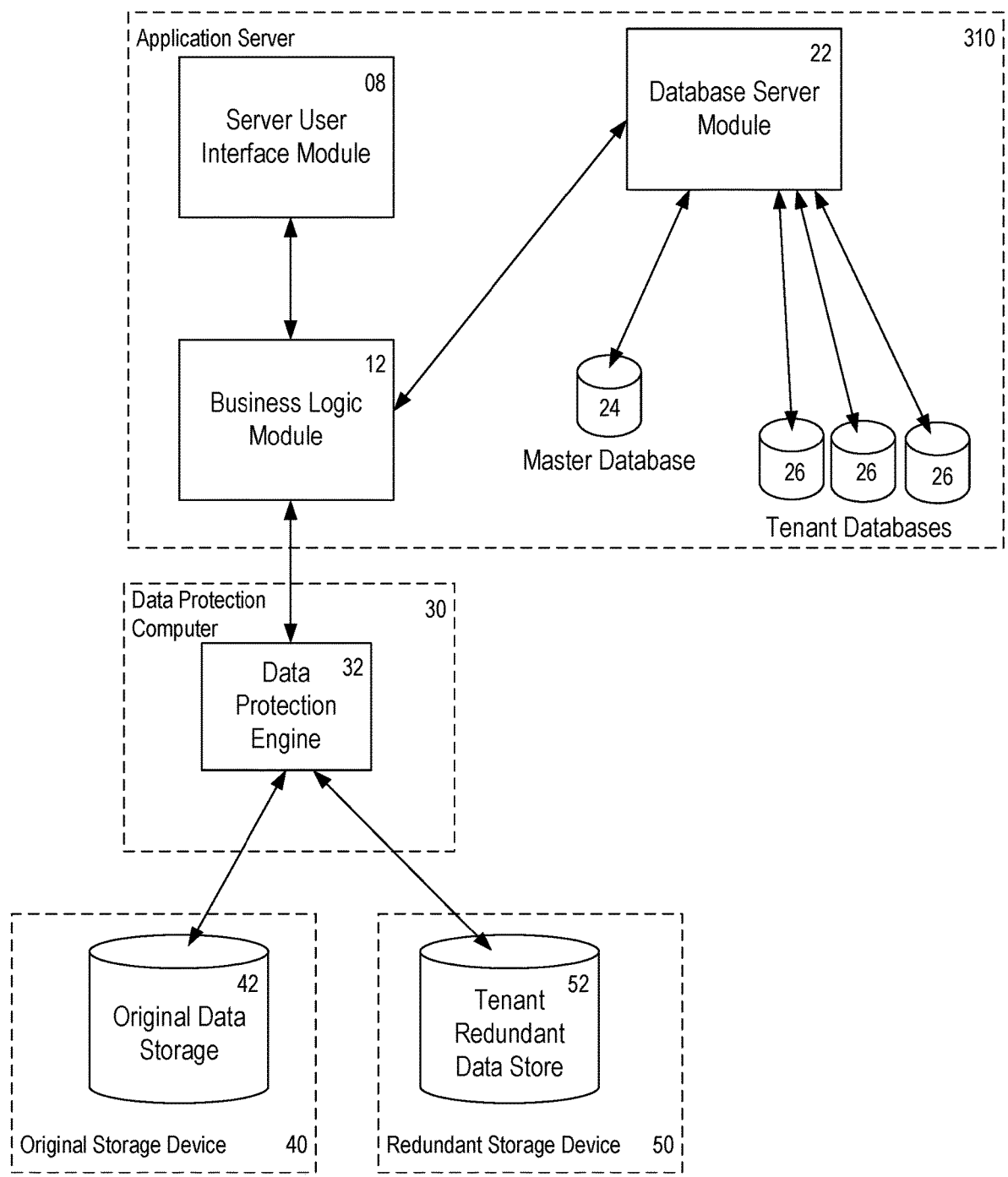
Figure 19:
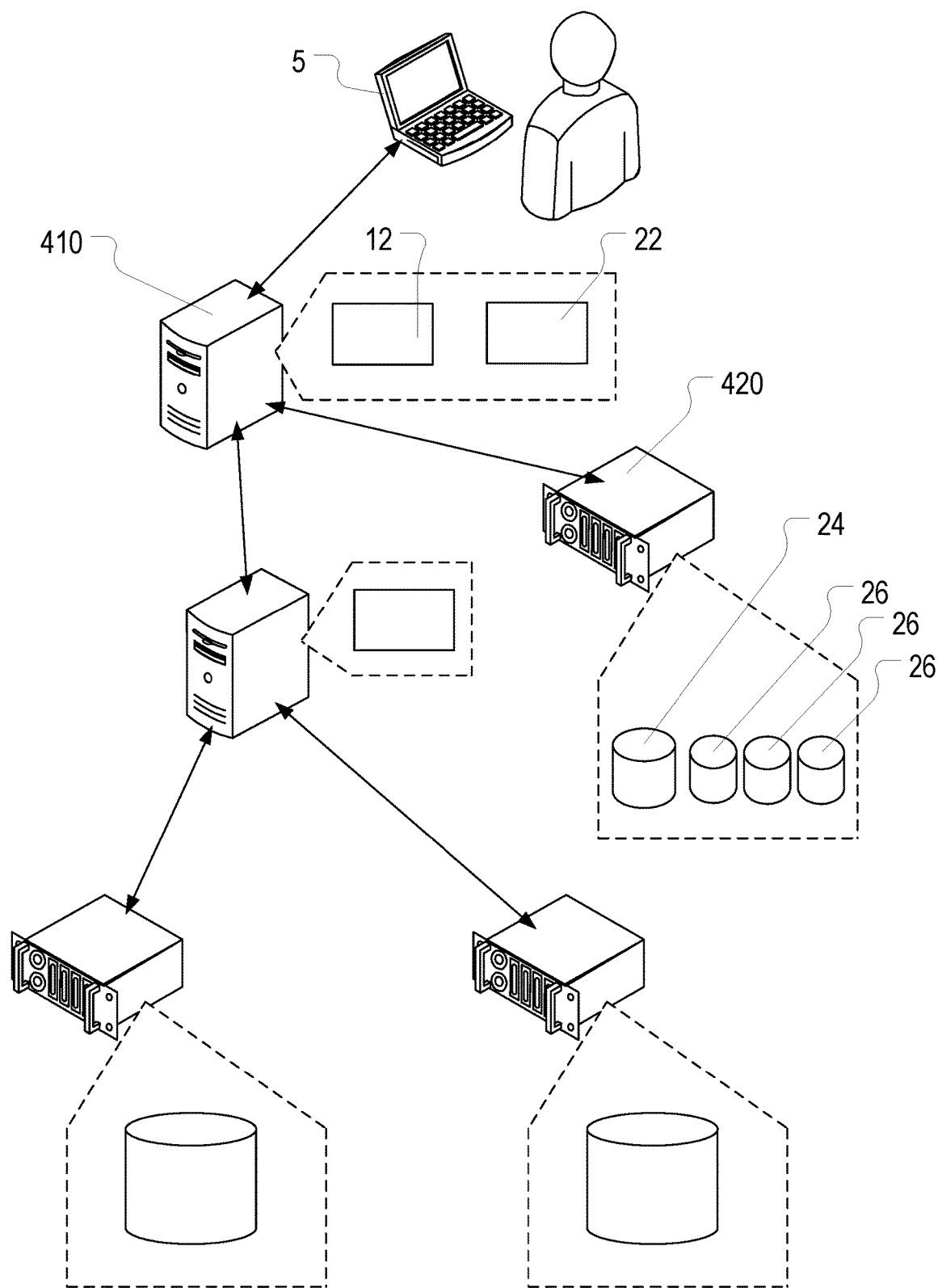
Figure 20:
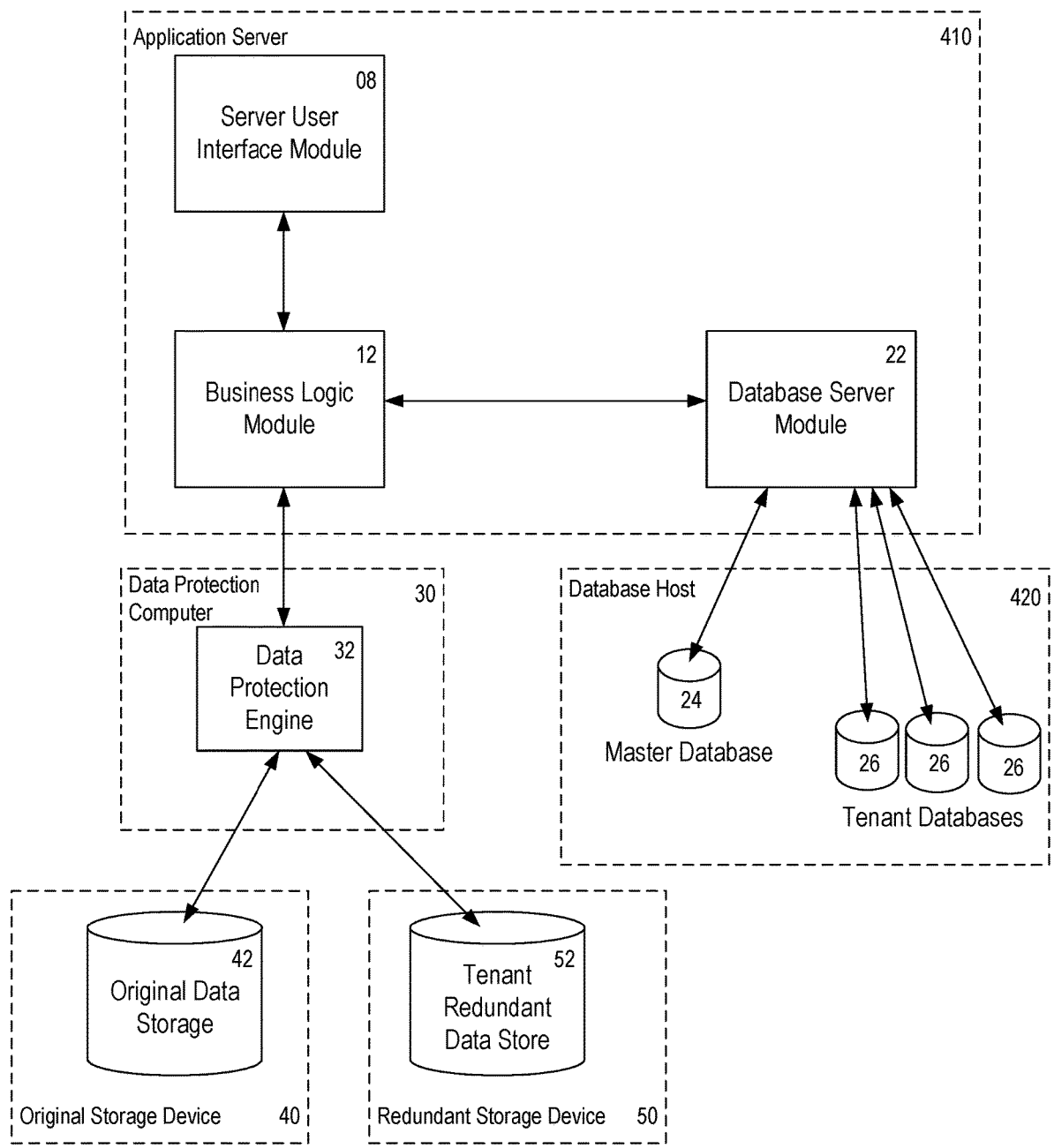
Figure 21:
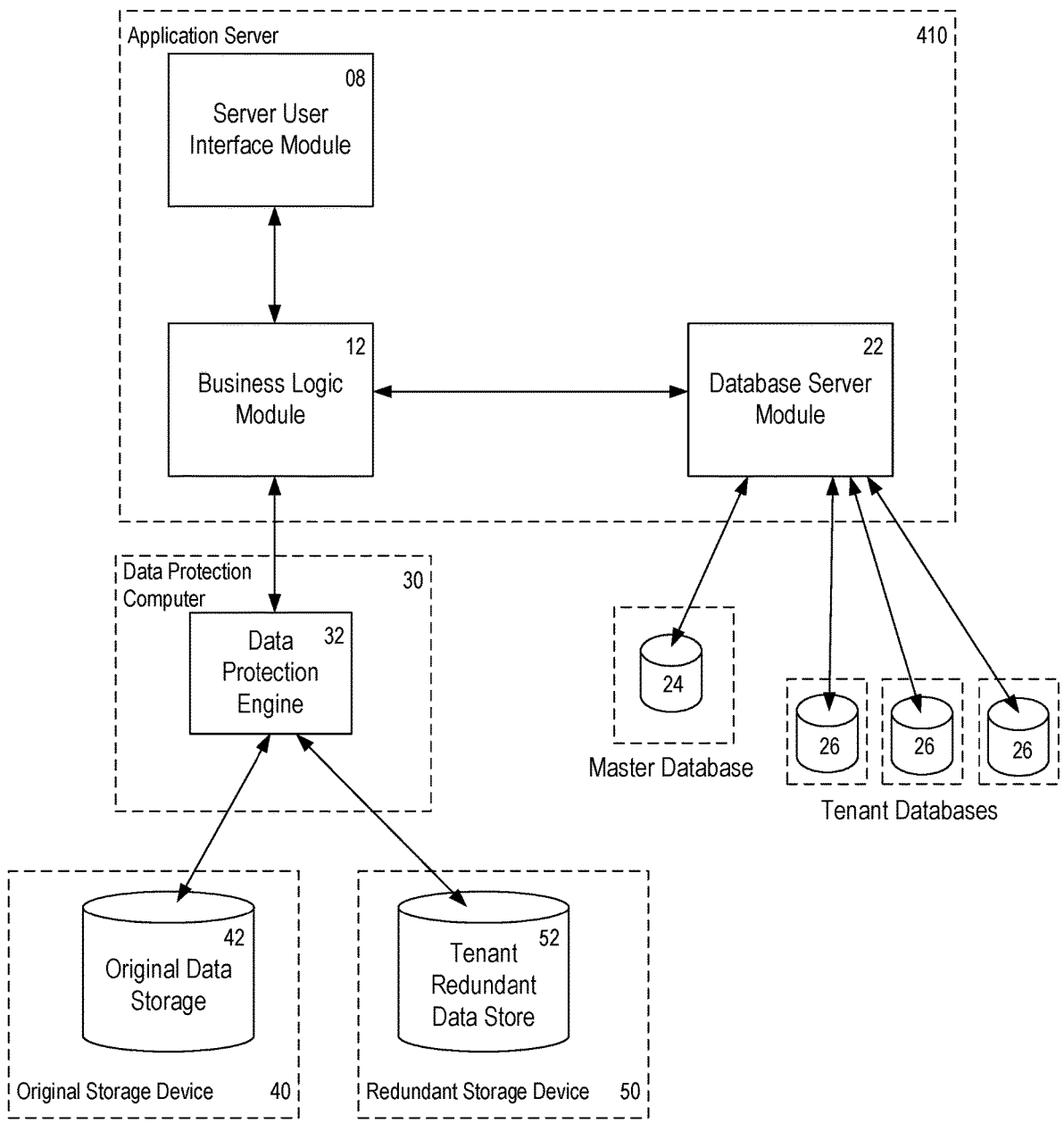

In one or more preferred implementations, a database server module 22 executes on a dedicated database server, as illustrated in FIGS. 1 and 14, while in one or more preferred implementations, a database server module 22 executes on a data protection application server 310 together with a business logic module 12, as illustrated in FIGS. 17-18. In one or more preferred implementations in which a database server module 22 executes on a data protection application server, master and/or user databases are located at a separate database host device 420, as illustrated in FIGS. 19-20, and may even be located at various disparate database host devices, as illustrated in FIG. 21.

Figure 22:
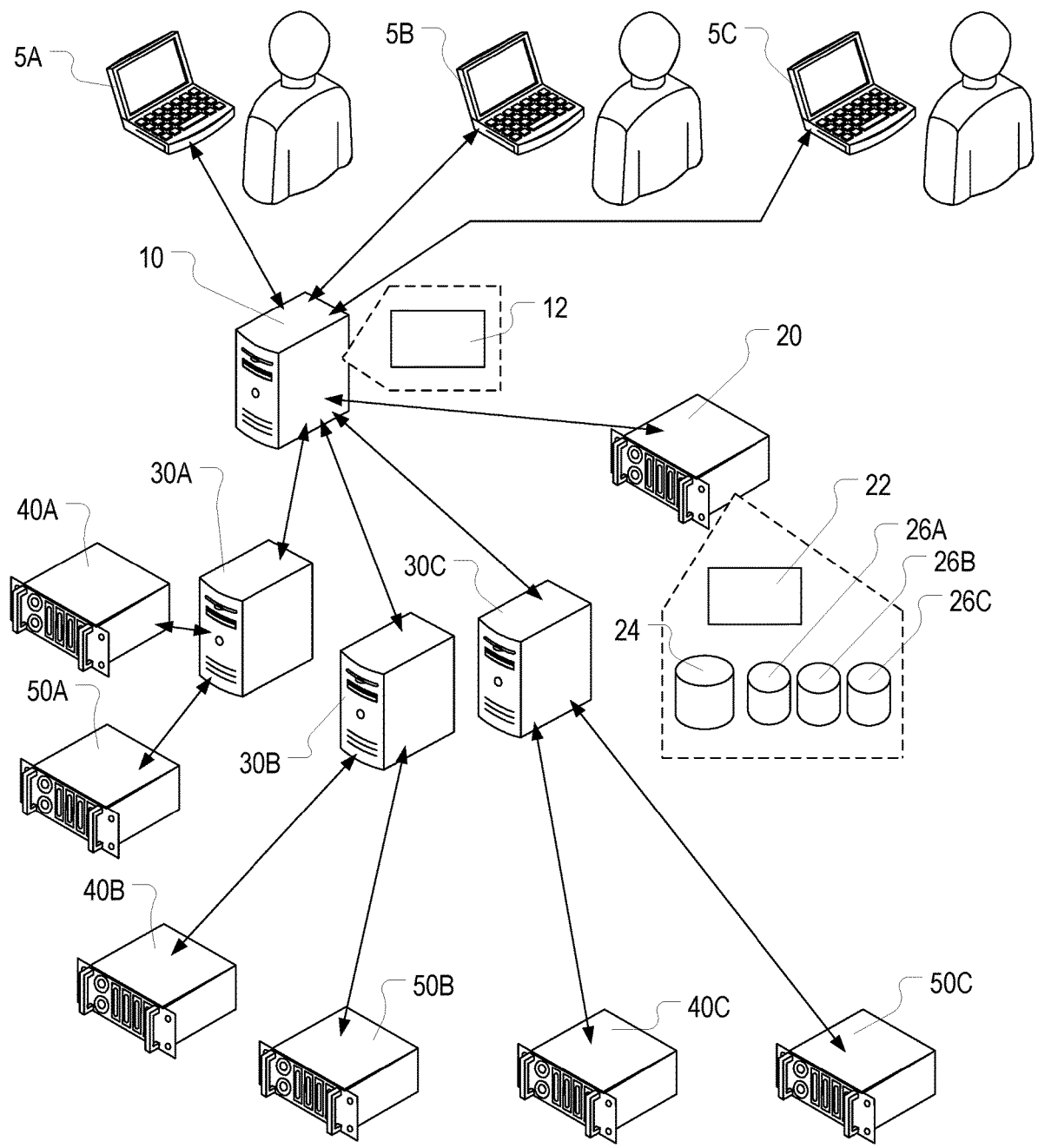

In one or more preferred implementations, each tenant may be associated with its own data protection engine module, as illustrated in FIG. 22.

As shown by example in FIG. 22, a multi-tenant data protection application is accessed by tenants through the use of a server user interface module executing on a data protection application server 10 in conjunction with multiple client user interface modules executing on data protection application client computers 5A-C. In this embodiment, business logic module 12 operates in conjunction with the server user interface module executing on the data protection application server computer 10, database server module 22 executing on the database server 20, and data protection engine modules executing on the data protection engine computers 30A-C.

According to other aspects herein, database server module 22 executing on a database server 20 operates in conjunction a master database 24 and tenant databases 26A-C. Data protection engine modules executing on data protection engine computers 30A-C operate in conjunction with tenant redundant data storage on redundant storage servers 50A-C.

Through the use of the data protection engines, the multitenant data protection application is operative to maintain redundant data storage. Data protection engines and redundant data storage may be utilized privately on a per tenant basis, or may be shared across multiple tenants, depending on the data protection application configuration.

In one or more preferred implementations, a multi-tenant data protection application provides the functionality for creating, synchronizing, maintaining and accessing redundant copies of data on a per tenant basis.

Redundant copies of data can be created and maintained through the utilization of one or more data protection engines. It should be appreciated by those skilled in the art that the redundant copies of data may include, but are not limited to mirror copies, image-level, file-level, block-level and byte-level copies, backups and replicas of the original data.

In one or more preferred implementations, a multi-tenant data protection application utilizes multiple data protection engine modules in order to create and maintain redundant copies of data.

Figure 23:
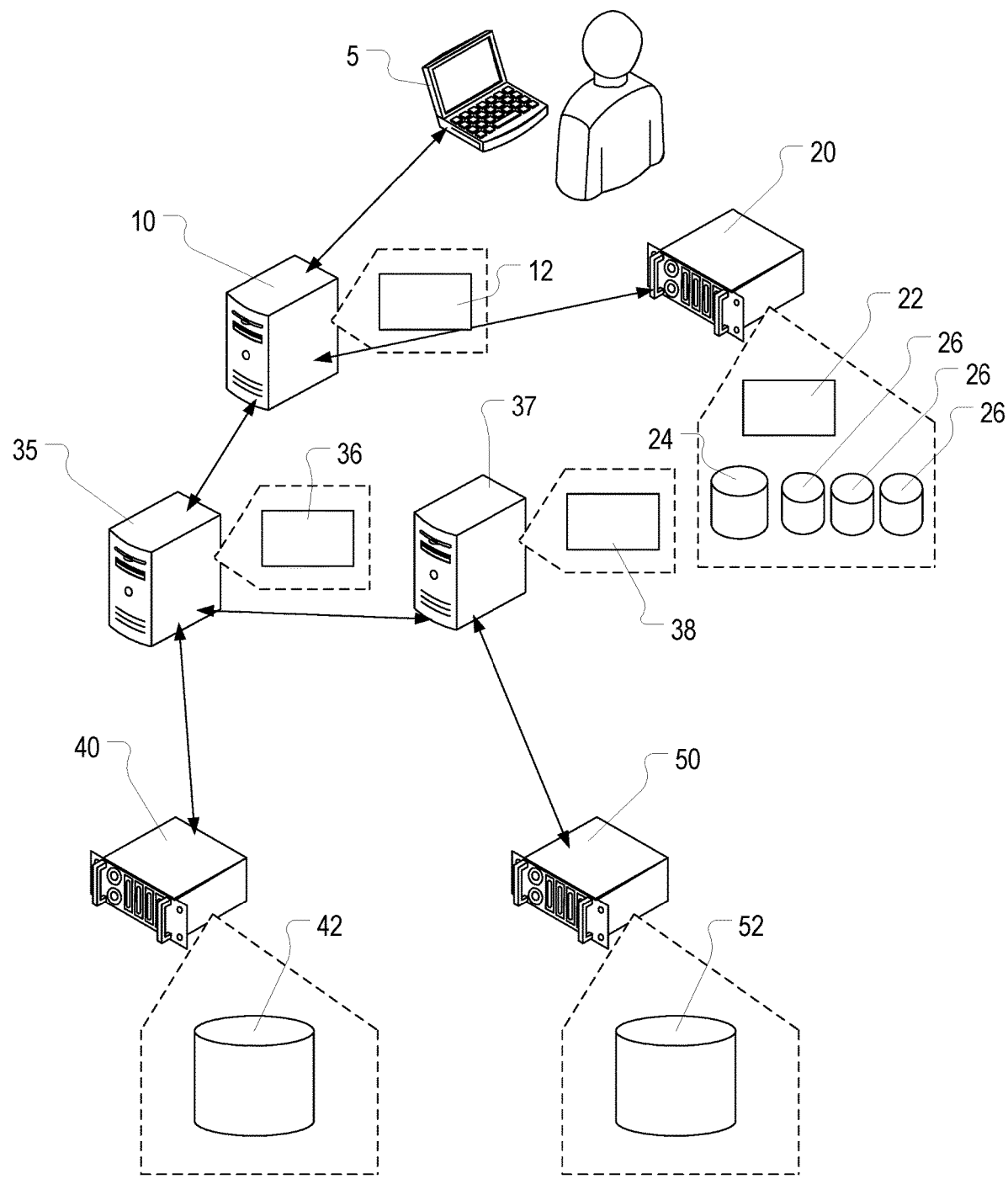

In one or more preferred implementations, a source data protection engine 36 running on a source data protection computer 35 operates in conjunction with original data storage, and a target data protection engine 38 running on a target data protection computer 37 operates in conjunction with redundant data storage, as illustrated in FIG. 23.

Figure 24:
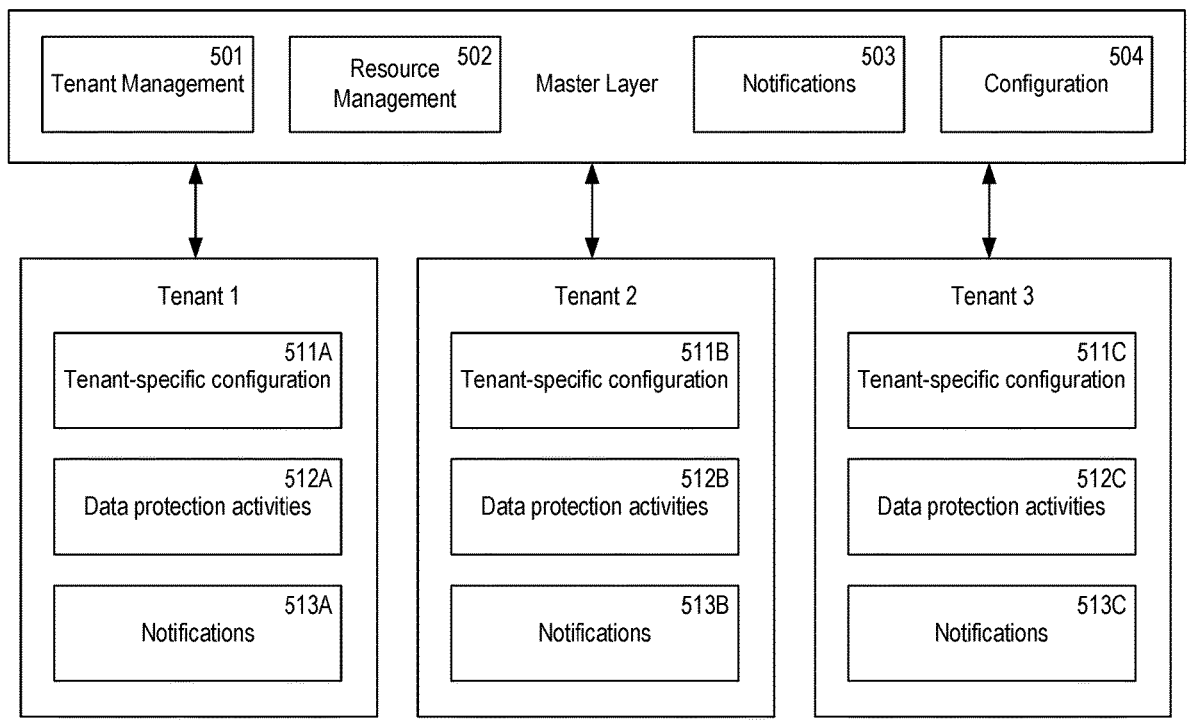
FIG. 24 presents a high-level illustration of business logic in accordance with one or more implementations.
Figure 25:
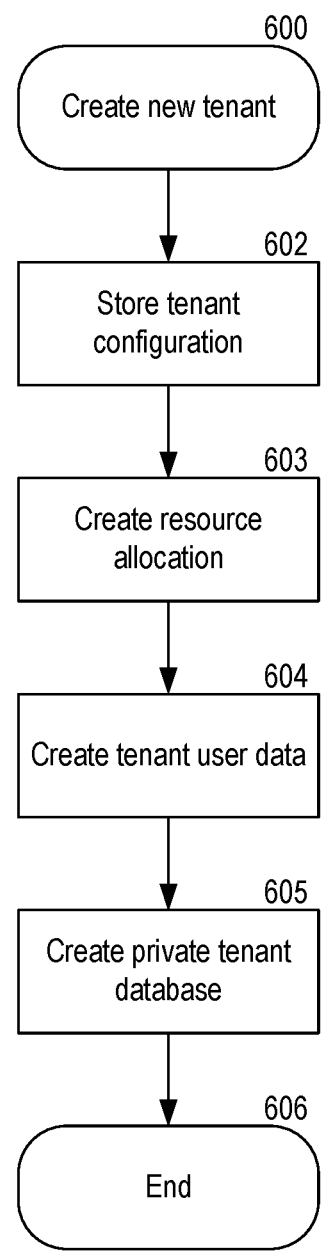
FIGS. 25-28 are flow diagrams showing illustrative processes for utilizing a multi-tenant data protection application.
Figure 26:
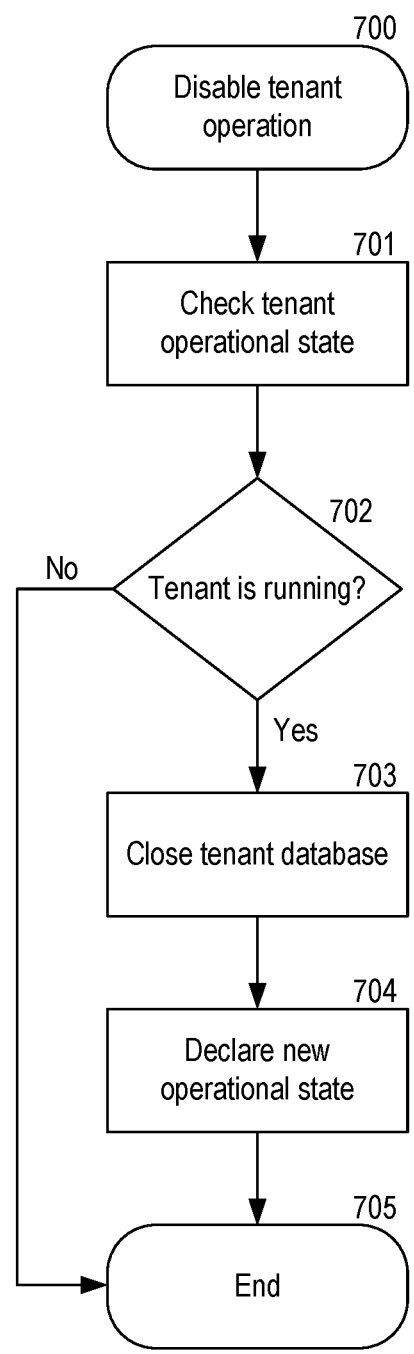
Figure 27:
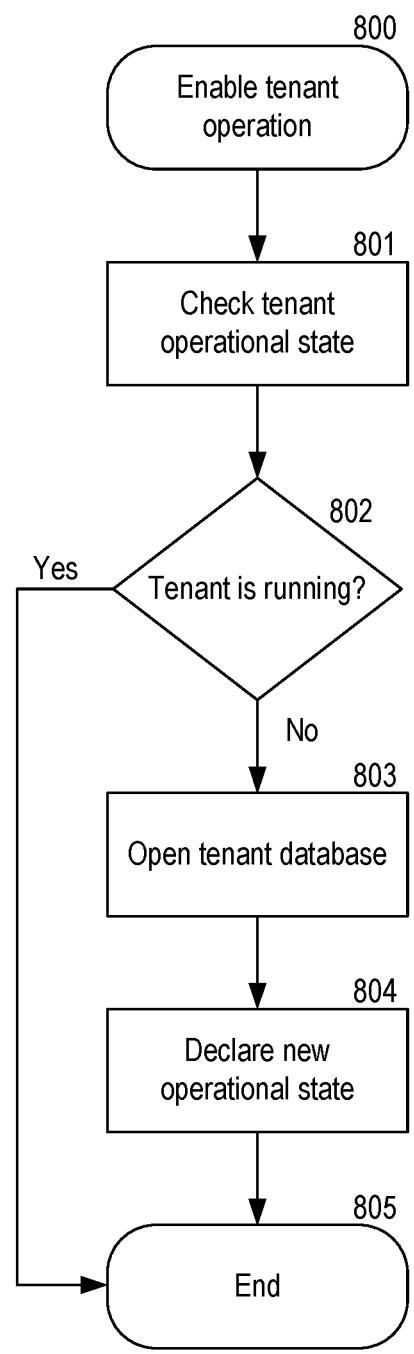
Figure 28:
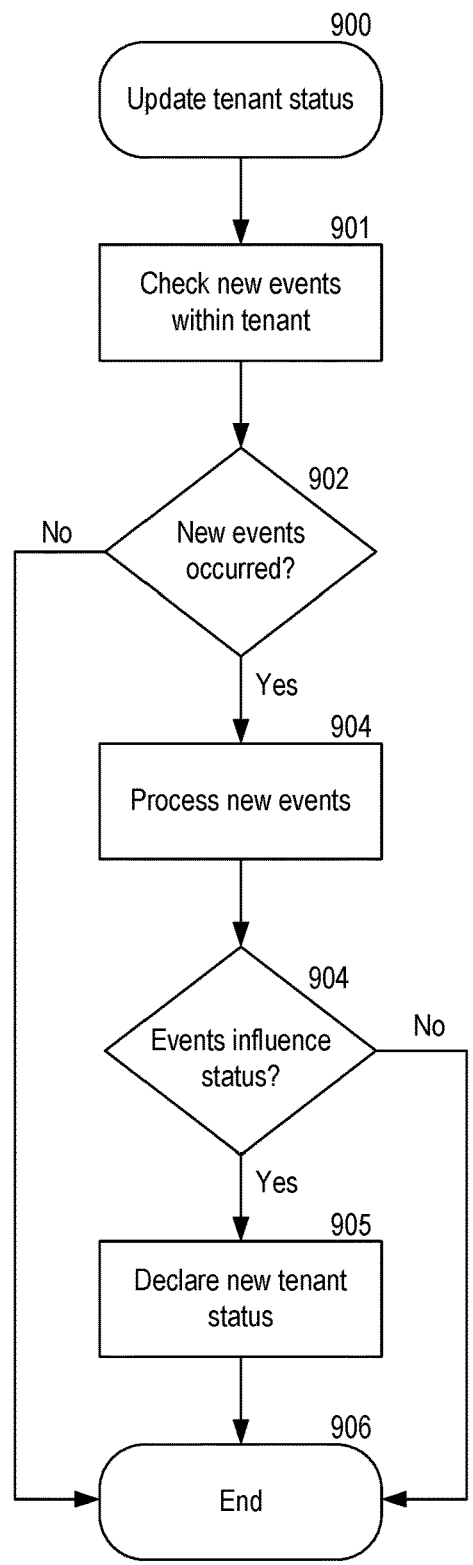

FIG. 24 presents a high-level illustration of business logic in accordance with one or more implementations. In accordance with one or more implementations, a multi-tenant data protection application utilizes a master layer such as the one illustrated as a primary logical layer that comprises tenant management 501, resource management 502, notifications 503 and configuration 504. The master layer serves as a main management layer that works in conjunction with tenants of the multi-tenant data protection application.

Still referring to FIG. 24, in this example, tenants of the multi-tenant data protection application logically comprise tenant-specific configuration 511A-511C, data protection activities 512A-512C and notifications 513A-513C. It will be appreciated that although only three logical tenants are illustrated, a system may store information for a number of tenants vastly exceeding three. These logical aspects are totally isolated on the per tenant basis. It should be appreciated that master layer and per-tenant logical aspects presented herein are provided by way of illustration only and should not be construed as limiting.

Through the separation of logical aspects, functionality and data on a per tenant basis, the multi-tenant data protection application achieves per-tenant isolation of potentially sensitive data. Through the utilization of the master layer and master database, the multi-tenant data protection application comprises a single point of management and allows for the possibility of using resources shared across multiple tenants.

Turning now to FIG. 10, additional details will be provided regarding the embodiments presented herein for providing a multi-tenant data protection application. In particular, FIG. 10 is a flow diagram showing a routine 600 that shows aspects of an illustrative process for creating a new tenant in accordance with one or more preferred implementations.

It should be appreciated that the logical operations described herein are implemented (1) as a sequence of computer implemented acts, methods, or program modules running on a computing system and/or (2) as interconnected machine logic circuits or circuit modules within a computing system. Implementation is a matter of choice dependent on the performance and other requirements of the computing system. Accordingly, the logical operations described herein are referred to variously as operations, structural devices, acts, or modules. These operations, structural devices, acts and modules may be implemented in software, in firmware, in special purpose digital logic, and any combination thereof. It should also be appreciated that more or fewer operations may be performed than shown in FIGS. 10-13 and described herein. These operations may also be performed in a different order than those described herein with respect to FIGS. 10-13.

The routine 600 begins in this example at operation 602, where tenant configuration is stored in the master database 110. According to preferred embodiments, the tenant configuration includes, but is not limited to, tenant authentication data, tenant associated resources description, tenant monitoring data and tenant notification data. It should be appreciated that other tenant configuration data may also be stored in the master database 110.

From operation 602, the routine 600 continues to operation 603. At operation 603, a portion of one or more shared resources is reserved and allocated for the new tenant.

Shared resources may include software licenses, redundant data storage, data protection engines, computing resources and networking resources. Other types of shared resources may also be utilized in creating the resource allocation 603 for the new tenant.

The routine 600 then proceeds to operation 604, where the user data for the new tenant is created. The user data may include usernames, passwords, user directories, user groups and permission attributes.

From operation 604, the routine 600 continues to operation 605, where a private tenant database is created for the new tenant. Once the tenant database has been created, the new tenant has been provisioned and can begin accessing the multi-tenant data protection application.

Accordingly, the routine 600 continues from operation 605 to operation 606, where it ends.

Referring now to FIG. 11, an illustrative routine 700 will be described for disabling the tenant operation in the multi-tenant data protection application described herein. In this embodiment, the routine 700 begins at operation 701, where the current operational state of the tenant is being checked. The routine 700 continues to operation 702, where the current operational state of the tenant is being analyzed.

In case the tenant is currently in the running operational state, the routine 700 proceeds to the operation 703. In case the tenant is currently not in the running operational state, the routine 700 switches to the operation 705 where it ends.

At operation 703, the private tenant database is being closed. Once the database is closed, the routine 700 proceeds to the operation 704 wherein the new operational state is declared for the current tenant. The routine 700 then proceeds to the operation 705 where it ends.

Turning to FIG. 12, a routine 800 will be presented for enabling the tenant operation in the multi-tenant data protection application described herein. In this embodiment, the routine 800 begins at operation 801, where the current operational state of the tenant is being checked. The routine 800 continues to operation 802, where the current operational state of the tenant is being analyzed.

In case the tenant is currently not in the running operational state, the routine 800 proceeds to the operation 803. In case the tenant is currently in the running operational state, the routine 800 switches to the operation 805 where it ends.

At operation 803, the private tenant database is being opened. Once the database is open, the routine 800 proceeds to the operation 804 where the new operational state is declared for the current tenant. The routine 800 then proceeds to the operation 805 where it ends.

Referring to FIG. 13, an illustrative routine 900 will be described for updating the tenant status within the tenant monitoring process. In preferred embodiments, because each tenant in the systems described herein is assigned with a certain set of resources and performs data protection activities related to redundant data copying, events of different type and severity may occur within tenants. The events may include, but are not limited to: errors, warnings, exceptions, process, action, object or data state changes, process or action failures, manually triggered actions, automatically triggered actions. According to aspects presented herein, different events and states can be collected and aggregated in a single user interface point on a per tenant basis. FIG. 13 illustrates one example of such a process for updating tenant status.

The routine 900 begins at operation 901, where the new events within the tenant are being checked. The routine 900 then continues to operation 902, where a determination is made as to whether the new events have occurred within the tenant or not. If the tenant has generated new events since the last status update, the routine 900 proceeds to operation 903, where the new events are being processed, and then proceeds to operation 904. If no new events have occurred, the routine 900 proceeds from operation 902 to operation 906, where it ends.

At operation 904, a determination is made as to whether new events influence the current overall status of the tenant. If so, the routine 900 proceeds from operation 904 to operation 905, where new status is declared for the current tenant. It should be appreciated that new status of the tenant may then be displayed in the user interface or reported in any other suitable form, such as messaging notification, text or color coding. The routine 900 then proceeds to the operation 906 where it ends. If at the operation 904 new events do not influence the current overall status of the tenant, the routine 900 proceeds to the operation 906 where it ends.

According to various embodiments presented herein, computers and devices may operate in a networked environment using logical connections to remote computers through a network. It should be appreciated that the network may also be utilized to connect to other types of networks and remote computer systems.

Examples of the present disclosure provide methods as well as apparatuses and systems comprising various modules or means that provide the functionality for performing the methods. The modules or means may be implemented as hardware, or may be implemented as software or firmware to be performed by one or more computer processors. Examples of the present disclosure can be provided as a computer program configured to cause the one or more processors to perform the methods.

Based on the foregoing description, it will be readily understood by those persons skilled in the art that the present invention is susceptible of broad utility and application. Many embodiments and adaptations of the present invention other than those specifically described herein, as well as many variations, modifications, and equivalent arrangements, will be apparent from or reasonably suggested by the present invention and the foregoing descriptions thereof, without departing from the substance or scope of the present invention. Accordingly, while the present invention has been described herein in detail in relation to one or more preferred embodiments, it is to be understood that this disclosure is only illustrative and exemplary of the present invention and is made merely for the purpose of providing a full and enabling disclosure of the invention. The foregoing disclosure is not intended to be construed to limit the present invention or otherwise exclude any such other embodiments, adaptations, variations, modifications or equivalent arrangements, the present invention being limited only by the claims appended hereto and the equivalents thereof.

What is claimed is:

1. A method for providing multi-tenant data protection, the method comprising:
   (a) maintaining, at a database server,
      (i) a master database containing configuration data for a plurality of tenants, and
      (ii) a plurality of tenant databases, each tenant database being associated with one of the plurality of tenants and containing tenant-specific information related to data to be protected for that tenant;
   (b) maintaining, by one or more data protection engines, a plurality of redundant tenant data stores, each redundant tenant data store containing a copy of data to be protected for that tenant, whereby the plurality of redundant tenant data stores provide tenant-specific data redundancy;

(c) getting and storing an indication of data at a first remote server to be backed up for a first tenant by
- (i) displaying, to a first user via a software application loaded on a first computer, an authentication user interface;
- (ii) receiving, from the first user via one or more input devices associated with the first computer, input corresponding to first authentication credentials;
- (iii) determining, based on a comparison of the first authentication credentials to authentication information maintained in the master database, that the first authentication credentials are valid authentication credentials associated with the first tenant of the plurality of tenants;
- (iv) displaying, to the first user via the software application loaded on the first computer, a user interface facilitating data protection functionality;
- (v) receiving, from the first user via one or more input devices associated with the first computer, input into the user interface facilitating data protection functionality corresponding to an identification of first data stored at the first remote server to be protected, and second authentication credentials associated with the first remote server and the first data to be protected;
- (vi) receiving, at a business logic module running on an application server, based on the user input, an indication of the first data to be protected, and the second authentication credentials;
- (vii) communicating, from the business logic module to a database server module, an indication of the first data to be protected, and the second authentication credentials;
- (viii) storing, by the database server module at a first tenant database associated with the first tenant, an indication of the first data to be protected, and the second authentication credentials;

(d) getting and storing an indication of data at a second remote server to be backed up for a second tenant by
- (i) receiving, at the business logic module, an indication of second data to be protected, and third authentication credentials;
- (ii) communicating, from the business logic module to a database server module, an indication of the second data to be protected, and the third authentication credentials;
- (iii) storing, by the database server module at a second tenant database associated with the second tenant, an indication of the second data to be protected, and the third authentication credentials;

(e) backing up, for the first tenant, the first data from the first remote server to a first tenant redundant data store by
- (i) accessing, by the business logic model from the first tenant database, the stored indication of the first data to be protected, and the second authentication credentials;
- (ii) communicating, from the business logic module to a first data protection engine running on a data protection computer, the accessed indication of the first data to be protected, and the accessed second authentication credentials;
- (iii) accessing, by the first data protection engine using the second authentication credentials, the first data to be protected from the first remote server; and
- (iv) storing, by the first data protection engine, a copy of the first data to be protected at the first tenant redundant data store, which is associated with the first tenant;

(f) backing up, for the second tenant, the second data from the second remote server to a second tenant redundant data store by
- (i) accessing, by the business logic model from the second tenant database, the stored indication of the second data to be protected, and the third authentication credentials;
- (ii) communicating, from the business logic module to a second data protection engine running on a data protection computer, the accessed indication of the second data to be protected, and the accessed third authentication credentials;
- (iii) accessing, by the second data protection engine using the third authentication credentials, the second data to be protected from the second remote server; and
- (iv) storing, by the second data protection engine, a copy of the second data to be protected at the second tenant redundant data store, which is associated with the second tenant.

2. The method of claim 1, wherein the one or more data protection engines include a respective data protection engine for each one of the tenant data protection stores.

3. The method of claim 2, wherein each of the data protection engines is loaded on a separate data protection computer.

4. The method of claim 1, wherein the software application comprises a web browser.

5. The method of claim 1, wherein the software application comprises a command line utility.

6. The method of claim 1, wherein the software application comprises a desktop client application.

7. The method of claim 1, wherein the application server comprises a plurality of physical machines.

8. The method of claim 1, wherein the database server comprises a plurality of physical machines.

9. The method of claim 1, wherein the application server is a virtual machine.

10. The method of claim 1, wherein the database server is a virtual machine.

11. The method of claim 1, wherein the data protection computer is a virtual machine.

12. The method of claim 1, wherein the application server comprises a virtual machine.

13. The method of claim 1, wherein the database server comprises a virtual machine.

14. The method of claim 1, wherein the data protection computer comprises a virtual machine.

15. The method of claim 1, wherein the software application comprises an arbitrary third-party program.

16. A system for providing multi-tenant data protection, the system comprising:
- (a) one or more database servers maintaining
  - (i) a master database containing configuration data for a plurality of tenants, and
  - (ii) a plurality of tenant databases, each tenant database being associated with one of the plurality of tenants and containing tenant-specific information related to data to be protected for that tenant;

(b) a plurality of data stores, each data store representing a redundant tenant data store for one of the plurality of tenants, each redundant tenant data store containing a copy of data to be protected for that tenant, whereby the plurality of redundant tenant data stores provide tenant-specific data redundancy;

(c) one or more data protection computers running one or more data protection engines; and (d) one or more application servers running one or more business logic modules each configured to
  (i) first, get and store an indication of respective data at a respective remote server to be backed up for a respective tenant by
    (A) receiving, based on user input from a user associated with the respective tenant, an indication of the respective data to be protected for the respective tenant, and respective authentication credentials for accessing the respective data from the respective remote server, and
    (ii) communicate, to a database server module associated with one or more of the database servers, an indication of the respective data to be protected for the respective tenant, and the respective authentication credentials for accessing the respective data from the respective remote server, and
  (ii) subsequently, effect backing up, for the respective tenant, of the respective data from the respective remote server to a respective one of the tenant redundant data stores by
    (A) accessing, from a respective tenant database associated with the respective tenant, the stored respective indication of the respective data to be protected, and the respective authentication credentials for accessing the respective data from the respective remote server,
    (B) communicating, to one of the data protection engines running on one of the data protection computers, the accessed indication of the respective data to be protected, and the accessed respective authentication credentials;

(e) wherein each of the data protection engines is configured to, based on a received communication from one of the business logic modules which includes an indication of data to be protected and authentication credentials,
  (i) access, using received authentication credentials, the data which was indicated as to be protected from the corresponding remote server, and
  (ii) store a copy of the accessed data to be protected at one of the tenant redundant data stores.

* * * * *